US008351084B2

(12) United States Patent
Bernal et al.

(10) Patent No.: US 8,351,084 B2
(45) Date of Patent: Jan. 8, 2013

(54) VECTOR ERROR DIFFUSION WITH EDGE CONTROL

(75) Inventors: Edgar A. Bernal, Webster, NY (US); Robert P. Loce, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 739 days.

(21) Appl. No.: 12/577,798

(22) Filed: Oct. 13, 2009

(65) Prior Publication Data

US 2011/0085218 A1    Apr. 14, 2011

(51) Int. Cl.
    *H04N 1/40*      (2006.01)
(52) U.S. Cl. ....... 358/3.05; 358/518; 358/1.9; 358/3.03; 358/3.27; 382/266
(58) Field of Classification Search .................... 358/1.9, 358/518, 2, 1, 3.03, 3.05, 3.1, 3.15, 3.27, 358/538; 382/266
See application file for complete search history.

(56) References Cited

U.S. PATENT DOCUMENTS

| 5,045,952 | A | | 9/1991 | Eschbach |
| 5,621,546 | A | * | 4/1997 | Klassen et al. ................ 358/536 |
| 7,548,346 | B2 | | 6/2009 | Yamada et al. |

FOREIGN PATENT DOCUMENTS

EP          654940 A1 *   5/1995

* cited by examiner

*Primary Examiner* — King Poon
*Assistant Examiner* — Jamares Q Washington
(74) *Attorney, Agent, or Firm* — Fay Sharpe LLP

(57) ABSTRACT

A mechanism for providing edge enhancement or attenuation in a vector error diffusion process includes warping a marking decision color space as a function of at least one pixel value of a target pixel. The warping changes the membership of sets of error modified pixel values associated particular sets of marking. The warping is controlled by a function of pixel values of a target pixel from an input image. Therefore, the warping is constant for uniform portions of the image. Since pixel values change at edges or where colors change, a mechanism is provided for the presence of edges to influence the vector error diffusion process. Selection of the function by which the marking decision color space is warped provides a means for controlling the aggressiveness of the edge enhancement or attenuation. Equivalent processing includes warping or adjusting error modified pixel values according to corresponding functions.

17 Claims, 10 Drawing Sheets

(FROM FIG. 7)

IDENTIFYING THE REGION EXTERNAL TO THE REGION BOUNDED BY THE WARPED MARKING DECISION SPACE POSITION OF THE REFERENCE POINTS AND WITHIN THE REGION BOUNDED BY PLANES TANGENT TO THE WARPED REGION BOARDERS AS THE IDENTIFIED POINT, IF THE ERROR MODIFIED PIXEL VALUES ARE ASSOCIATED WITH A POINT EXTERNAL TO A REGION BOUNDED BY THE WARPED MARKING DECISION SPACE POSITION OF THE REFERENCE POINTS AND WITHIN A REGION BOUNDED BY PLANES THAT ARE TANGENT TO THE WARP REGION BOARDERS AND THAT EXTEND IN A DIRECTION PERPENDICULAR TO THE DIRECTION OF RESPECTIVE AXIS IF THE ERROR MODIFIED PIXEL VALUES ARE NOT ASSOCIATED WITH A POINT THAT FALLS WITHIN THE BOUNDARY ONE OF THE RESPECTIVE WARPED REGION BORDERS ⟋814

DETERMINING RESPECTIVE DISTANCES TO RESPECTIVE REFERENCE POINT POSITIONS OF THE WARPED MARKING DECISION COLOR SPACE THAT ARE ASSOCIATED WITH A MARKING DECISION TO PLACE A MARK FOR ONE AND ONLY ONE COLORANT FROM THE POSITION ASSOCIATED WITH THE VALUES OF THE ERROR MODIFIED PIXEL VALUES IF THOSE PIXEL VALUES ARE ASSOCIATED WITH A POSITION THAT DOES NOT FALL WITHIN A WARPED REGION AND IF THOSE PIXEL VALUES ARE NOT ASSOCIATED WITH THE POINT EXTERNAL TO THE REGION BOUNDED BY THE WARPED MARKING DECISION SPACE POSITION OF THE REFERENCE POINTS AND WITHIN THE REGION BOUNDED BY PLANES TANGENT TO THE WARPED REGION BOARDERS ⟋818

IDENTIFYING A REGION ASSOCIATED WITH THE RESPECTIVE REFERENCE POINT POSITION OF THE WARPED MARKING DECISION COLOR SPACE THAT IS ASSOCIATED WITH A MARKING DECISION TO PLACE A MARK FOR ONE AND ONLY ONE COLORANT AND THAT IS CLOSEST TO THE POSITION ASSOCIATED WITH THE VALUES OF THE ERROR DIFFUSED PIXEL VALUES AS THE IDENTIFIED POINT IF THE ERROR MODIFIED PIXEL VALUES ARE ASSOCIATED WITH A POSITION THAT DOES NOT FALL WITHIN THE BOUNDARY ONE OF THE RESPECTIVE WARPED REGION BOARDERS AND IF THE ERROR MODIFIED PIXEL VALUES ARE NOT ASSOCIATED WITH THE POINT EXTERNAL TO THE REGION BOUNDED BY THE WARPED MARKING DECISION SPACE POSITION OF THE REFERENCE POINTS AND WITHIN THE REGION BOUNDED BY PLANES THAT ARE TANGENT TO THE WARPED REGION BORDERS ASSOCIATED WITH THE REFERENCE POINT THAT IS NOT ASSOCIATED WITH A MARKING DECISION TO PLACE A MARK FOR ONE AND ONLY ONE COLORANT AND THAT EXTEND IN A DIRECTION PERPENDICULAR TO THE DIRECTION OF RESPECTIVE AXIS ⟋822

FIG. 8

VECTOR ERROR DIFFUSION WITH EDGE CONTROL

BACKGROUND

The presently disclosed embodiments are directed toward techniques for quantizing or transforming continuous tone or contone image data for rendering on reduced quantization rendering devices such as liquid crystal displays and binary or high-addressable printers. Embodiments will be described with regard to subtractive colorant (e.g., cyan, yellow and magenta) based rendering devices (e.g., printers). Embodiments are applicable to other colorant spaces, including, but not limited to the red, green and blue color spaces of display devices and the additional colorant dimension color spaces of high fidelity (HI-FI) and Photo Tone printing devices.

Image quantization techniques include halftoning via screening and error diffusion techniques. These techniques determine or select marking decisions. Marking decisions can be binary (on or off, mark or no mark) or be associated with high addressability pixels associated with additional quantization levels. However, marking decisions are associated with fewer quantization levels that are contone pixel values. Accordingly, selection of a set of marking decisions for an image is said to result in a reduced quantization version of that image. Each class of technique has advantages and disadvantages as compared to the other class. At commonly available resolutions, halftoning can lead to visual artifacts. For instance, halftone cell repetitions often fall within a range of frequencies that are visually detectable. Error diffusion often results in marks being placed at a frequency and in a non-repeating manner that is less visible. However, error diffusion techniques can be associated with other objectionable phenomena.

For example, U.S. Pat. No. 5,045,952 by Eshbach, titled "Method for Edge Enhanced Error Diffusion", which is incorporated herein by reference in its entirety, indicates that a difficulty with the Floyd-Steinberg error diffusion algorithm is that an inherent edge related artifact is built into the algorithm. Eshbach indicates that analysis of the output of the Floyd-Steinberg error diffusion algorithm illustrates a characteristic overshoot (too dark or too light) at upward and downward transitions, or steps, in the continuous tone digital image data.

Eshbach describes a method for edge modification (i.e., enhancement or attenuation) that is applicable to scalar error diffusion techniques.

As used herein, —scalar—refers to quantization techniques which consider only a single value from a given pixel when making a marking decision regarding that value of that pixel. For example, scalar error diffusion techniques are applied to black and white or monochrome contone images to make marking decisions regarding a single colorant. Additionally, scalar error diffusion techniques can be applied separately to each separation of a color image. For example, where each pixel of a contone version of an image describes a small portion of the image in terms of colorant densities of cyan, magenta, yellow and optionally black colorants (CMY and optionally K), a scalar form of error diffusion makes marking decisions regarding the cyan colorant without considering the values of the target pixel associated with the other colorants (e.g., magenta, yellow and optionally black). Similarly, a marking decision is made with regard to the magenta colorant without considering the values of the pixel related to the cyan, yellow and black colorants.

Eshbach's technique varies a marking decision threshold applied to an error modified pixel value according to the contone value of the related original contone image pixel, thereby providing a means for influencing the location of lightness or darkness in the vicinity of an edge. However, scalar error diffusion techniques do not consider or compensate for the effects of interactions between dot patterns of different color separations. Accordingly, scalar techniques can suffer from color errors and displeasing moiré and other patterning artifacts.

In vector error diffusion (VED), contone values regarding a first colorant (e.g., cyan) can have a bearing or be a factor in a marking decision associated with a second colorant (e.g., magenta). Indeed, all the values of a particular pixel may be considered when making a marking decision regarding a particular colorant. That is, in vector error diffusion, colors are treated as points in a multidimensional color space with the colors printable or displayable located at discrete reference locations within that space. When a continuous tone or contone color is to be displayed, for example, the closest displayable color can be selected for display, with color error being calculated as a vector in the color space and diffused to neighboring pixels.

However, the above-described form of vector error diffusion can be associated with patterning artifacts.

U.S. Pat. No. 5,621,546 by Klassen et al., titled "Method and Apparatus for Vector Error Diffusion with Output Color Control", which is incorporated herein by reference in its entirety, describes a method of vector error diffusion (VED) that disperses the pixels printed or displayed to increase the dominant spatial frequency so that less visible noise is produced. The method biases marking decisions away from producing black and white pixels and away from producing pixels of secondary colors (comprised of two colorants) in favor of making marking decisions for a given pixel that provide only a single colorant (primary colors).

These vector error diffusion techniques assign marking decisions to various locations in their respective color spaces and in so doing, move away from the concept of thresholding. Accordingly, the method of Eshbach is not applicable to vector error diffusion and vector error diffusion techniques have been without a mechanism for controlling or modifying (i.e., enhancing or attenuating) edges.

BRIEF DESCRIPTION

A method for transforming a color contone description of an image into a reduced quantization version of the image according to a desired edge modification can include combining contone pixel values of a target pixel with contone error values, thereby generating a set of error modified pixel values and selecting marking decisions based on the set of error modified pixel values and at least one function of at least one of the contone pixel values of the target pixel, wherein a color error modified pixel value associated with at least the first colorant is a factor in selecting a marking decision regarding at least the second colorant, wherein marking decisions for a given pixel may sacrifice color accuracy in favor of placing a mark for a given set of error modified pixel values and wherein the at least one function biases the marking decision associated with a respective error modified pixel value toward making a mark as a respective value of the received contone pixel values increases in darkness when the desired edge modification is an edge enhancement and wherein the at least one function biases the marking decision associated with a respective error modified pixel value away from making a mark as a respective value of the received contone pixel values decreases in darkness when the desired edge modification is an edge attenuation. The method can also include determining color error associated with the selected marking decision, storing the determined color error for use in processing a subsequent pixel of the contone image and at least one of storing or rendering the selected marking decisions. Repeating this process, whereby each pixel in an image or selected portion of an image is selected and processed as the target pixel results in transforming the image into a reduced quantization version of the image. For instance, the process can be used to transform the image into a binary or high addressable quantization version of the image. The described biasing provides a mechanism for increasing or decreasing the responsiveness of a vector error diffusion process to edges or changes in color as processing moves along a processing path through the image.

An image processing system that is operative to transform a color contone description of an image into a reduced quantization version of the image according to a desired edge modification can include a pixel value combiner, a marking decision selector and color error determiner.

For instance the pixel value combiner can be operative to receive contone pixel values of target pixels of the image which call for colorant densities of a plurality of colorants of an associated image rendering device, the plurality of colorants including a first colorant associated with at least a first pixel value of the target pixel and a second colorant associated with at least a second pixel value of the target pixel, to receive contone color error values associated with marking decisions made in regard to a previously processed contone pixel of the image or initial contone error values and to combining the contone pixel values with the contone error values, thereby generating a set of error modified pixel values.

The marking decision selector can be operative to select marking decisions based on the sets of error modified pixel values and at least one function of at least one of the received contone pixel values of the target pixels, wherein a color error modified pixel value of a target pixel associated with at least the first colorant is a factor in selecting a marking decision regarding at least the second colorant of the target pixel, wherein marking decisions for a given pixel may sacrifice color accuracy in favor of placing a mark for a given set of error modified pixel values and wherein the at least one function biases the marking decision associated with a respective error modified pixel value toward making a mark as a respective value of the received contone pixel values increases in darkness when the desired edge modification is an edge enhancement and wherein the at least one function biases the marking decision associated with a respective error modified pixel value away from making a mark as a respective value of the received contone pixel values decreases in darkness when the desired edge modification is an edge attenuation.

The color error determiner can be operative to determine color error associated with each selected marking decision and make contone color error values describing the determined color error available for the processing of at least one subsequently selected target pixel.

BRIEF DESCRIPTION OF THE DRAWINGS

FIGS. 7 and 8 outline aspects of an embodiment of the method of FIG. 1.

DETAILED DESCRIPTION

Figure 1:
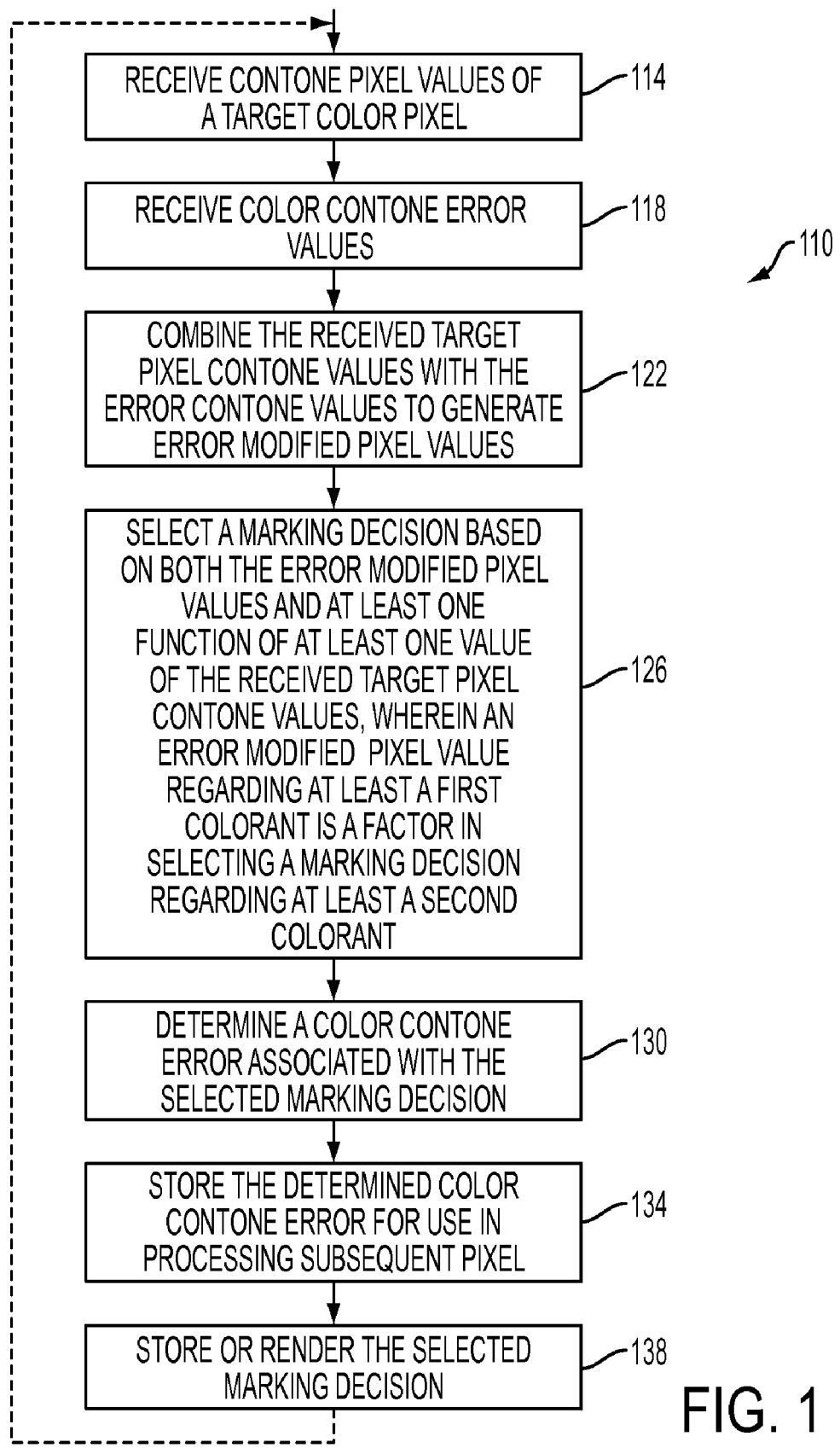
FIG. 1 is a flow diagram outlining a method for transforming a contone description of an image into a quantized version of the image.

A method 110 that is operative to transform a color contone description of an image into a reduced quantization version of the image according to a desired edge modification can include receiving 114 contone pixel values of a target color pixel, receiving 118 color contone error values, combining 122 the received target pixel contone values with the error contone values to generate error modified pixel values and selecting 126 a marking decision based on both the error modified pixel values and at least one function of at least one value of the received target pixel contone values, wherein an error modified pixel value regarding at least the first colorant is a factor in selecting a marking decision regarding at least a second colorant. That is, the selection 126 of a marking decision is made according to a variation of vector error diffusion wherein a pixel value related, for example, to a cyan colorant can have a bearing on or be a factor in a marking decision related to, for example, a magenta colorant. As will be explained in greater detail below, the at least one function of at least one value of the received target pixel provides a mechanism for adjusting the vector error diffusion technique to provide a mechanism for modifying (enhancing or attenuating) the appearance of edges in the image. The method 110 further includes determining 130 a color contone error associated with the selected 126 marking decision, storing 134 the determined contone color error for use in processing one or more subsequently processed pixels and storing or rendering 138 the selected marking decision.

This process (114-138) can be repeated for each pixel in the image being processed. As each pixel is processed, at least one value of the respective received 114 target pixel separately and individually influencing the marking decision selection 126 associated with that respective target pixel according to the received 114 contone pixel values of that target pixel.

Figure 2:
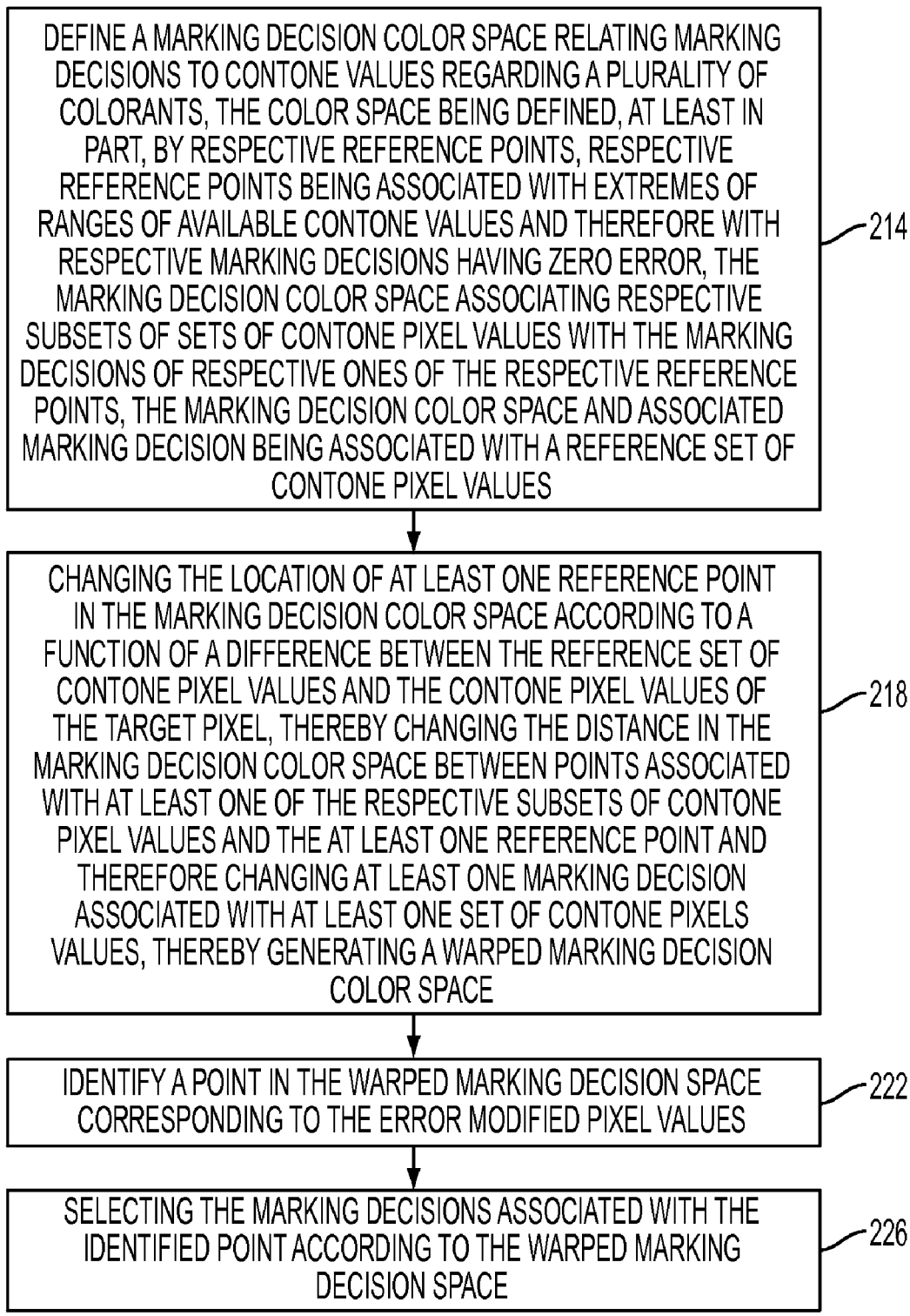
FIG. 2 is a flow diagram outlining aspects of an embodiment of the method of FIG. 1.

For example, referring to FIG. 2, selecting 126 a marking decision based on both the error modified pixel values and at least one function of at least one value of the received target pixel can include defining 214 a marking decision color space relating marking decisions to contone values regarding a plurality of colorants, the color space being defined, at least in part, by respective reference points, the respective reference points being associated with respective extremes of ranges of available contone values and therefore with respective marking decisions having zero error. Such a marking decision color space associates respective subsets of sets of contone pixel values with the marking decisions of respective ones of the respective reference points. The defined 214 marking decision color space, as will be addressed in greater detail below, is associated with a reference set of contone pixel values. For instance, the marking decision color space is used as defined 214 to select 126 a set of marking decisions for a set of error modified pixel values when a received 114 set of contone pixel values of a target pixel corresponds to the reference set of contone pixel values. For example, the reference set of contone pixel values may describe a white or completely unmarked pixel or image portion.

Selecting 126 the marking decision based on both the error modified pixel values and at least one function of at least one value of the received target pixel can further include changing 218 the location of at least one reference point in the marking decision color space according to a function of a difference between the reference set of contone pixel values (e.g., white) and the contone pixel values of the target pixel. Such a movement of at least one reference point changes the distance or relative position in the marking decision color space between points associated with at least one of the respective subsets of contone pixel values and the at least one reference point and therefore may change at least one marking decision associated with at least one set of contone pixel values. Such a change 218 or relocation of a reference point and marking decision association generates a warped marking decision color space relative to the defined 214 marking decision color space and results in an edge modification (enhancement or attenuation) when the warped space is used in a VED process.

In such an embodiment, selecting 126 a marking decision based on both the error modified pixel values and at least one function of at least one value of the received target pixel further includes identifying 222 a point in the warped marking decision space corresponding to the error modified pixel values and selecting 226 the marking decision associated with the identified point according to the warped marking decision space.

Figure 3:
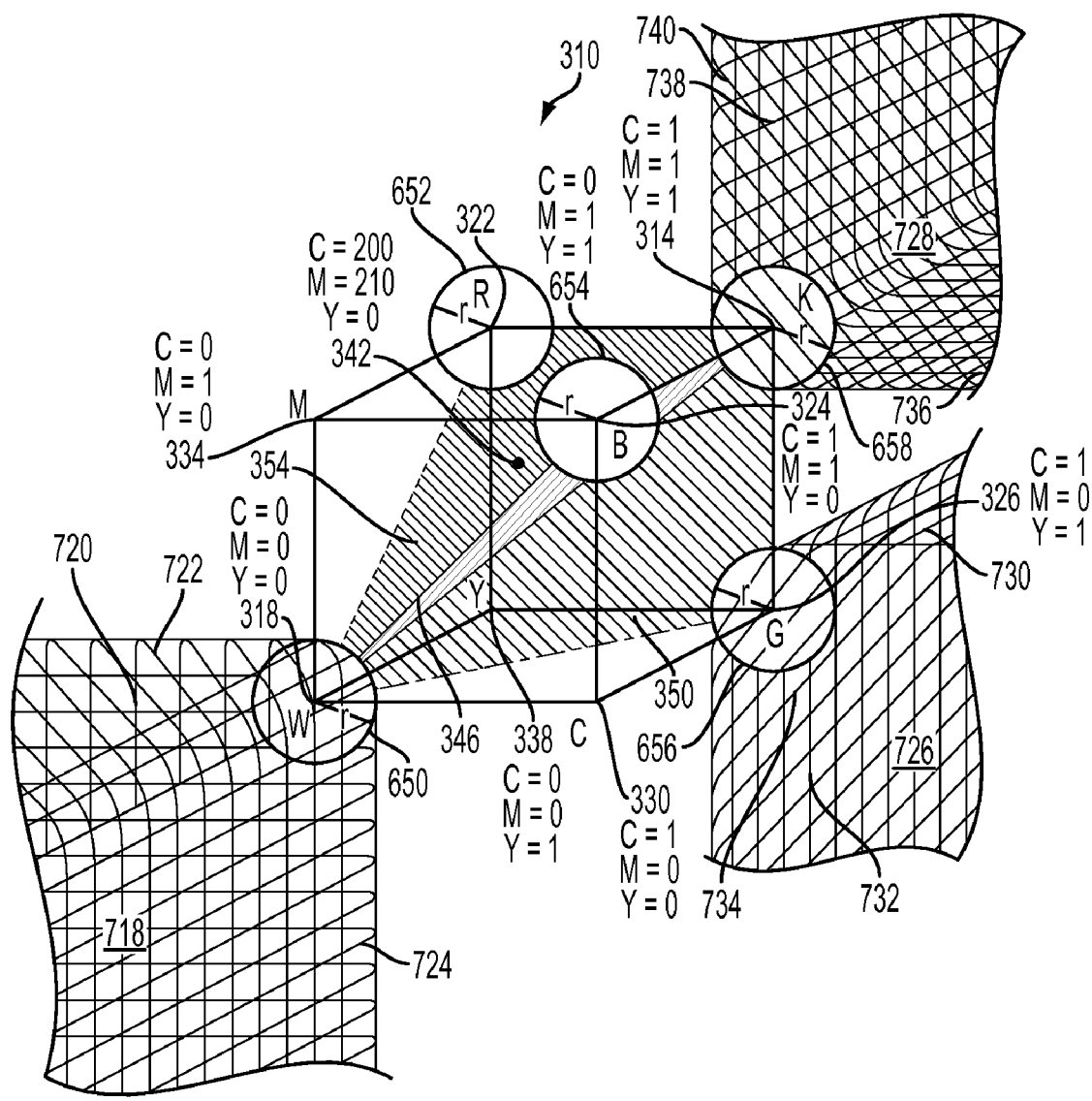
FIG. 3 depicts aspects of illustrative marking decision color space definitions.

For example, referring to FIG. 3, in a subtractive printing environment involving cyan, magenta and yellow colorants (e.g., inks, toners, pigments, etc.) defining 214 the marking decision color space can include defining a marking decision color space, at least in part, by the location of respective reference points associated with extremes of ranges of available contone values and therefore with respective marking decisions having zero error. For instance, in common eight bit based image or document processing environments, contone values typically range from 0 to 255. The value 0 is associated with not placing a mark and the value 255 is associated with placing a mark.

In a subtractive colorant printing environment associated with cyan (C), magenta (M) and yellow (Y) colorants, contone values of C=255, M=255 and Y=255 are often quantized to a zero error decision to place a mark using each colorant (C=1, M=1, Y=1) and such marking decisions, when rendered, are perceived as black (K). Accordingly, one reference point used in defining 214 the marking decision color space 310 can be a black (K) reference point 314 associated with contone values at the extreme (e.g., 255) of ranges associated with cyan, magenta and yellow contone values and zero error marking decisions to place a mark using each of the three colorants (C=1, M=1, Y=1). At the other extreme of the ranges of contone values available for the three colorants (e.g., 0) and zero error decisions to place no mark using each of the three colorants (C=0, M=0, Y=0) (on, typically, a white print medium) can be a reference point considered to be associated with a perception of white and therefore with a white (W) reference point 318.

Other reference points can be associated with combinations of extremes of colorant values. For example, in a subtractive colorant marking decision color space, a red (R) reference point 322 is associated with contone colorant values of C=0, M=255, Y=255 and related zero error marking decisions to not place a mark using cyan (C=0) and placing a mark using both the magenta and yellow colorants (M=1, Y=1). A blue (B) reference point 324 can be associated with extreme contone values of C=255, M=255 and Y=0, which is associated with zero error marking decisions to place marks using cyan and magenta colorants and to not place a mark using a yellow colorant. A green (G) reference point 326 can be associated with contone values at extremes of the available ranges of C=255, M=0, Y=255 and related zero error marking decisions to place marks using cyan and magenta colorants and not placing a mark using a magenta colorant (C=1, M=0, Y=1).

Some reference points are associated with a zero error marking decision to place a mark for one and only one colorant. For example, in the subtractive colorant color space 310, a reference point associated with extremes of contone pixel values of cyan=255, magenta=0 and yellow=0 is a cyan (C) reference point 330 associated with zero error marking decisions to place a mark using a cyan colorant and not placing marks using a magenta and yellow colorants. Accordingly, with regard to the three colorants of the color space (and disregarding the use of, for example, a black colorant) the cyan reference point is associated with placing a mark for one and only one colorant. Similarly, a magenta (M) reference point 334 may be associated with extremes of the available range of contone values of cyan=0, magenta=255 and yellow=0 and zero error marking decisions to place no mark using cyan and yellow colorants and to place a mark using a magenta and only a magenta colorant (of the colorants of the color space). Additionally, a yellow (Y) reference point 338 is associated with a set of contone values at extremes of available ranges (e.g., C=0, M=0, Y=255) and therefore with a set of zero error marking decisions for those values to place a mark for one and only one colorant associated with the color space 310 (i.e., yellow) and to not place a mark using the cyan and magenta colorants.

It is noted that the marking decision color space 310 is illustrative only and that other color spaces can be defined for other applications. For example, where the colorants are light emitting diodes or phosphors of a display device, reference points representing red, green and blue might be associated with decisions to place a mark using one and only one colorant (e.g., a red, green or blue phosphor or LED), a white reference point might be associated with marking decisions to place marks using all three colorants (e.g., R=1, G=1, B=1) and a black reference point might be associated with a decision not to place a mark using any of the three colorants (e.g., R=0, G=0, B=0).

Cyan, magenta and yellow reference points might be associated with marking decisions to place marks using combinations of two colorants. For example, a yellow reference point might be associated with marking decisions to place marks using a red and green colorant and not place a mark using a blue colorant.

Furthermore, color spaces of a higher dimensionality are also possible. For example, a color space can be defined 214 to associate marking decisions with various sets of contone values in color spaces involving the additional colorants available in Hi-Fi rendering devices. Additionally, where a rendering device uses a reduced set of colorants, a marking decision color space can be defined 214 in just two dimensions.

In the light and mid-tone colors, placing marks for a given pixel often leads to a darkness error which results in no marks being placed for neighboring pixels when that darkness error is distributed according to error diffusion techniques. In light and mid-tone color ranges, this can lead to a relatively low spatial frequency for the placement of marks. This low spatial frequency can lead to the perception of patterning artifacts.

As indicated above, in order to combat this, vector error diffusion techniques assign marking decisions to contone pixel values, or sets thereof, in a manner that biases marking decisions toward placing marks for a given pixel using fewer colorants than would otherwise be used. For example, a pixel having a set of contone pixel values including C=200, M=210, Y=0 might ordinarily be associated with a decision to place marks using both cyan and magenta colorants. However, where vector error diffusion (VED) is used to reduce the noticeability of pattern artifacts, a marking decision color space (e.g., 310) is segmented or partitioned in a manner that biases marking decisions toward decisions to use or place marks for fewer colorants. For example, the marking decision color space may map that set of contone pixel values (C=200, M=210, Y=0) (e.g., 342) to the marking decision associated with the closest primary colorant or reference point associated with a marking decision to place a mark using one and only one colorant. For example, the set of contone pixel values (C=200, M=210, Y=0), which might ordinarily be mapped to a decision to place marks using both cyan and magenta colorants, is instead mapped according to VED to a marking decision to place a mark using only a magenta colorant.

Such a marking decision is too light in the cyan separation. Accordingly, error is diffused to one or more neighboring pixels in a manner that darkens or increases an associated cyan pixel value of the one or more neighboring pixels. Accordingly, the chances are increased that a marking decision will be made to place a mark using a cyan colorant when the one or more neighboring pixels (or error diffused versions thereof) are processed. Moreover, since the marking decision color space (e.g., 310) is defined in a manner biased toward placing marks using a reduced number of colorants, as the neighboring pixels are processed, additional errors in darkness will be associated with the processing of the neighboring pixel and will be propagate to pixels neighboring those pixels. Accordingly, as will be discussed in greater detail below, VED increases the spatial frequency of marks and reduces the visibility of imaging artifacts.

There are many ways to partition or segment a marking decision color space to provide a bias toward placing fewer marks per pixel. In the illustrative marking decision color space 310, the space 310 is segmented or partitioned by planes. Each plane intersects a surface associated with a contone value of zero for one colorant and dividing that surface into portions associated with the other colorants. For example, a first plane 346 intersects a surface associated with a contone value of zero for a yellow colorant and divides the surface between the magenta and cyan colorants. A second plane 350 intersects a surface associated with a contone value of zero for the magenta colorant and divides the surface between the cyan and yellow colorants. A third plane 354 intersects a surface associated with a contone value of zero for the cyan colorant and divides the surface between the magenta and yellow colorant. The point 342 discussed above is closer to the reference point 334 associated with placing a mark using the magenta colorant and only the magenta colorant than are any points on the planes 346, 350, 354 located as measured along the direction of a vector from that reference point 334 to the point 342. Therefore, according to the definition of the illustrative marking decision color space 310, the point 342 is associated with the marking decision of the reference point 334. In this way, a marking decision color space definition can associate respective sets of contone pixel values with a marking decision associated with a respective reference point based on respective functions of distance in the color space of points identified by the sets of contone pixel values to respective ones of the reference points. This segmentation is illustrative only. Other marking decision color space definitions including other segmentations are contemplated.

As indicated above, the reference points (314, 318, 322, 326, 330, 334, 338) are associated with contone values at the extremes of available ranges and also with zero error marking decisions. That is, a contone value of 255 in an 8 bit system indicates a desire for a 100% colorant density and a mark placed for a given pixel (in a binary rendering device) represents a 100% colorant density. A contone value of zero represents a desire for a 0% colorant density. A marking decision not to place a mark exactly corresponds to a 0% colorant density. In contrast, a contone value of, for example, 64 represents a desired colorant density of about 25%. However, a binary rendering device can only place a mark or not place a mark in response to such a contone value. A decision not to place a mark means that the associated portion of the image will be rendered to be 25% too light. On the other hand, a decision to place a mark in response to a contone value of 64 would result in a corresponding portion of a rendered image being 75% too dark.

According to error diffusion, compensating offsets are diffused to pixels that neighbor pixels associated with such marking decision errors. When a pixel is rendered too darkly, contone values associated with neighboring pixels are reduced by a corresponding amount thereby lightening the neighborhood of the pixel to compensate for its excessive darkness. When a pixel is rendered too lightly, contone values associated with neighboring pixels are increased thereby increasing the chances that marks will be placed for those pixels, thereby darkening the vicinity of the original pixel in a manner that compensates for its excessive lightness. Pixels that receive such compensating offset values are referred to herein as error diffused pixels.

Depending on specifications of particular error diffusion techniques, contone values associated with error diffused pixels can extend far beyond the available contone value range. For example, contone pixel values can be lightened below zero or darkened above 255. In this regard, the illustrative marking decision color space 310 can extend to infinity in all directions but is defined by the reference points (e.g., 314-338) and the surfaces and segmentations associated therewith.

As indicated above, in some embodiments, selecting 126 a marking decision based on both the error modified pixel values and at least one function of at least one value of the received target pixel contone values can include defining 214 a marking decision color space (e.g., 310) wherein the marking decision color space and associated marking decisions are associated with a reference set of contone pixel values. In such embodiments, according to embodiments of the method 110 that quantizes the image according to a desired edge modification, the location of at least one reference point (e.g., 314-338) in the marking decision color space (e.g., 310) is changed 218 according to a function of a difference between the reference set of contone pixel values and the contone pixel values of a target pixel.

For example, the illustrative marking decision color space 310 can be associated with a reference color, such as, for example, white. That is, the illustrative marking decision color space 310 can be defined 214 to be the marking decision color space to use in selecting 126 a marking decision for an error diffused pixel when the associated received 114 contone pixel values of a target color pixel describe an image portion that is white (i.e., C=0, M=0, Y=0). As received 114 pixel values vary from white, the marking decision color space 310 can be warped to generate a warped marking decision color space associating somewhat different sets of contone pixel values with the respective marking decisions of the reference points (i.e., 314-338). With appropriate selection of warping techniques, the warping and the associated change in marking decision mappings or assignments can be used to modify (e.g., enhance or attenuate) edge as part of a process for transforming a color contone description of an image into a reduced quantization version of the image using vector error diffusion (VED).

For example, it is to be appreciated that points in the illustrative marking decision color space 310 to the right of, for example, the surface bounded by the C 330, G 326, K 314 and B 324 reference points are associated with marking decisions to place marks for more colorants than are points to the left of that surface. This observation is all the more true for points on either side of planes parallel to referenced CGKB surface and inside the boundary of the illustrative cube. Accordingly, warping or transforming that decision space (310) by moving that saturated surface (saturated because it is associated with a saturated contone value (e.g., 255) for the cyan colorant at all points on the surface) toward its opposing secondary surface (i.e., the surface defined by the W 318, M 334, R 322 and Y 338 reference points) tends to increase the chances that decisions will be reached to place marks for a given set of pixel values. Accordingly, warping a marking decision color space in the above-described manner as image data transitions from a region of white to a region including cyan increases the chances that a decision to place a cyan mark will be made. Therefore, the transition or edge including cyan will be enhanced.

Conversely, moving the saturated plane in the opposite direction increases the volume and therefore the number of points in the region including point 342 for which decisions are made not to place a mark using the cyan colorant. Therefore, warping the marking decision color space in this direction reduces the chance that a decision is reached for a given pixel to place a cyan mark. Accordingly, warping a marking decision color space in this manner tends to attenuate an edge including cyan. Similar warpings or combinations thereof can be applied to the other saturated surfaces in regard to other primary colorants. For example, the warpings and associated marking decision selections 126 can be based on one or more functions of at least one of at least one received 114 contone pixel value of a target pixel. Herein below we refer to such functions as warping functions.

We will refer to warping functions associated with movements along the cyan, magenta and yellow axes of the illustrative marking decision space 310 generally as $f_c(\bullet)$, $f_m(\bullet)$, and $f_y(\bullet)$, respectively. The • notation indicates some argument for the function. We will describe these functions as having arguments that are of the same type as the warping function. That is, an argument of $c_0$ will be used for function $f_c$. We introduce it here with the more general • notation because the warping does not need to be limited to dependence on its own dimension. For example, an argument of $ac_0+bm_0$ (where a and b are constant scale factors) could be used as the argument for $f_c$. Such a warping function would allow an amount of magenta in a received image pixel to be a factor in the warping of the image space along the cyan axis.

For clarity, in the following discussion, we will adopt the following conventions. Positive functions will be those that enhance edges while negative functions will be those that attenuate edges. As indicated above, positive functions are those where $f_i(\bullet)$ shifts the saturated plane associated with colorant i toward its corresponding secondary plane. Negative functions are those where $f_i(\bullet)$ shifts the saturated plane away from its corresponding secondary plane. Various functional forms can be used for $f_i(\bullet)$. For example, $f_i(\bullet)$ can take the form of algebraic, exponential or trigonometric functions.

In some embodiments, selected warping functions can change the location of one or more reference points beyond the range of the input pixel values (e.g., more than 255 in our illustrative 8 bit implementation). Such situations can be addressed with a more complicated warping as will be explained below.

In our illustrative embodiment, the argument of each function (i.e., $f_c$, $f_m$, and $f_y$) is the corresponding contone pixel value received 114 for a given target pixel. The functions can be thought of as operating by taking each value on a decision space (e.g., 310) axis and mapping those values to new values for the axis. Thought of this way, the partitions in the space maintain their shape, but the axes values that index into those partitions are changed. Another equivalent form is to "warp" error modified pixel values in a reciprocal manner. The following description continues the description of the warping or changing of respective locations of respective reference points. Subsequently, an indication of how the above-mentioned and other equivalent forms can be implemented will also be provided.

Figure 4:
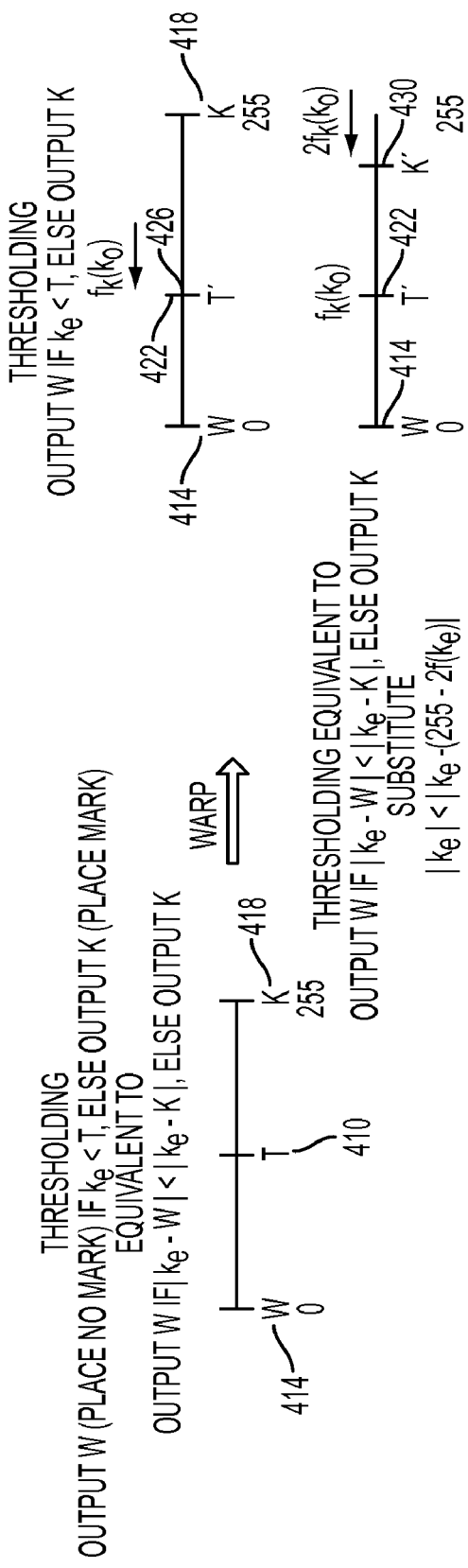
FIG. 4 illustrates an equivalency between a relocation of an error diffusion threshold and a relocation of color space reference points.

Referring to FIG. 4, in traditional error diffusion of a single colorant or black and white image, a threshold 410 is set to be between two extremes of the available colorant range 414, 418. For example, where the available contone range is from 0 to 255, the threshold might be set at 127.5. If an error modified pixel value (e.g., $k_e$) is less than the threshold, then a marking decision is made to place no mark (e.g., render a white portion of an image). If the error modified pixel value is not less than the threshold, then a decision is made to place a mark (e.g., render the associated portion of the image as black). We note that an equivalent result is achieved by determining whether the error modified pixel value is closer to one extreme (e.g., 414) or the other (e.g., 418). That is, if the difference between the low contone value or white reference point contone value and the error modified pixel value is less than the difference between the error modified pixel value and the other extreme 418 (e.g., the contone value representing 100% black), then a decision is made to place no mark. If that condition is not met, then a decision is made to place a mark.

A marking decision space warping effect can be achieved in single colorant applications by warping the position of the threshold to a warped threshold position 422. As illustrated, the threshold position is warped according to a warping function $f_k(k_i)$, where $k_i$ is a value from an input pixel associated with the position of the error modified pixel value. In such a system, a decision to place no mark would be made if the error modified pixel value is less than the warped threshold value and a decision to place a mark would be made otherwise.

In vector error diffusion (VED), developing an expression for a threshold for a particular colorant is difficult because of the consideration of values in other color planes or separations. Accordingly, marking decisions are made based on the equivalent comparison of distances from the error modified pixel value to the position of reference points. However, in the case of a warped threshold 422, this equivalent comparison is no longer valid. For instance, it is the intention of the warping to associate a point 426 at a value above that of the warped threshold 422 with a decision to place a mark. However, the point 426 may be closer to the white reference point 414 than it is to the black reference point 418. Accordingly, the comparison of distances to reference points discussed above is no longer equivalent to a comparison of an error modified pixel value to the warped threshold value 422.

However, a comparison of distances expression that achieves equivalent results to the warping of the threshold value is achieved by warping or changing 218 the position of a reference point (e.g., the black K 418 reference point). In the illustrated example, the threshold was moved closer to the white reference point by an amount equal to $f_k(k_i)$. To achieve the same distance as is between the white reference point 414 and the warped threshold value 422 between the warped threshold value 422 and a warped position 430 of the black reference point, it is necessary to warp the position of the black reference point by an amount equal to $2f_k(k_i)$. The warped position 430 of the black reference point becomes its original position minus the above-described offset or $255-2f_k(k_o)$.

Figure 5:
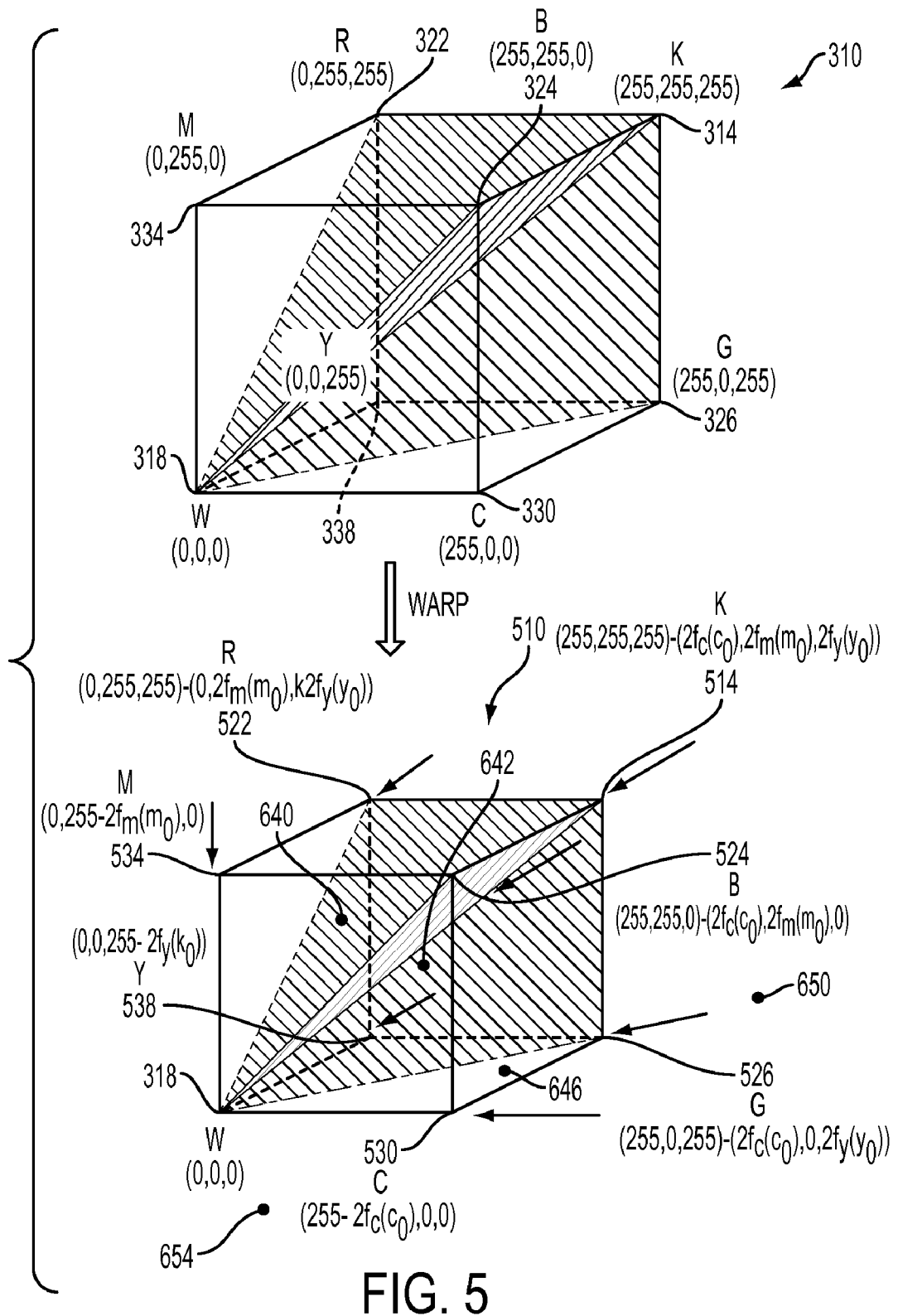
FIG. 5 illustrates a relocation of reference points in a three dimensional marking decision color space.

Referring to FIG. 5, the aspects discussed with regard to FIG. 4 can be extended to warp a marking decision color space (e.g. 310) to arrive at a warped marking decision color space 510. The warping depicted in FIG. 5 is a mechanism for changing 218 the location of at least one reference point in the marking decision color space according to a function of a difference between the reference set of contone pixel values (e.g., white or C=0, M=0, Y=0) and the contone pixel values of a target pixel, thereby changing the distance in the marking decision color space between points associated with at least one of the respective subset of contone pixel values and the at least one reference point and therefore, possibly changing at least one marking decision associated with at least one set of contone pixel values.

When the desired edge modification is edge enhancement, wherein the reference points and associated surfaces are moved toward other reference points/surfaces from their reference positions, there can be two cases or categories of warping or reference point location changing 218. These two cases are referred to herein as (a) and (b). Case (a) covers instances wherein the warping or location change (e.g., $2f(\bullet)$) is less than the original separation along the respective axis of movement (e.g., less than 255 contone value counts in the illustrated embodiment). Case (b) addresses those instances wherein the warping or location change 218 is greater than that original separation.

In the illustrative embodiments, the warping or location changing 218 is done on the basis of axes of the defined 214 marking decision color space. That is, reference points associated with primary surfaces are moved the same amount in the direction of a given primary axis (e.g., the C, M or Y axis). For example, the cyan, green, blue and black (CBGK 330, 324, 326, 314) reference points move the same amount along the cyan direction (toward or away from its opposing secondary plane (e.g., WMYR 318, 334, 338, 322)). Similarly, the plane defined by the green, yellow, red and black reference points (GYRK 326, 338, 322, 314) is moved as a unit in the direction of the yellow axis either toward or away from its opposing secondary plane (CWMB 330, 318, 334, 324).

Case (a)

For example, using the illustrative color space 310 and maintaining the conventions developed above with regard to FIG. 4, when the warping amount ($2f_c(c_0)$, $2f_m(m_0)$ and/or $2f_y(y_0)$) is less than or equal to the contone value representing the maximum colorant density (e.g., 255 in the illustrative example), the location of at least one reference point is changed 218 by translating one or more planes of the illustrative cube-shaped region of the defined 114 marking decision color space (e.g., 310).

For instance, the saturated cyan plane (CBGK) and associated reference points are translated towards or away from the red plane (RMYW) by an amount indicated by $2f_c(c_0)$. The saturated magenta plane (MRBK) and associated reference points are translated towards or away from the green plane (CGYW) by an amount indicated by $2f_m(m_0)$ and the saturated yellow plane (YRGK) and associated reference points are translated towards or away from the blue plane (BCMW) an amount indicated by $2f_y(y_0)$.

As a result of these translations, locations of at least one reference point are changed 218 to warped locations as indicated by the following expressions wherein $(c_1,m_1,y_1)$ is the location of the indicated translated reference point:

$W$ (e.g., 318): $(c_l,m_l,y_l)=(0,0,0)$ $R$ (e.g., 522): $(c_l,m_l,y_l)=(0,255-2f_m(m_0),255-2f_y(y_0))$ $G$ (e.g., 526): $(c_l,m_l,y_l)=(255-2f_c(c_0),0,255-2f_y(y_0))$ $B$ (e.g., 524): $(c_l,m_l,y_l)=(255-2f_c(c_0),255-2f_m(m_0),0)$ $K$ (e.g., 514): $(c_l,m_l,y_l)=(255-2f_c(c_0),255-2f_m(m_0),255-2f_y(y_0))$.

When the warping value for one or more of the axes is equal to the maximum contone value (e.g., 255), the position of the secondary plane and the warped position of its corresponding saturated plane coincide or overlap one another. When all three warping values are equal to the contone value associated with 100% colorant density (e.g., 255), the surfaces of the marking decision color space are collapsed to a single point in the marking decision color space at, for example, (0,0,0). The effect this warping or position changing 218 has on marking decision associations will be further described below.

Case (b)

Figure 6:
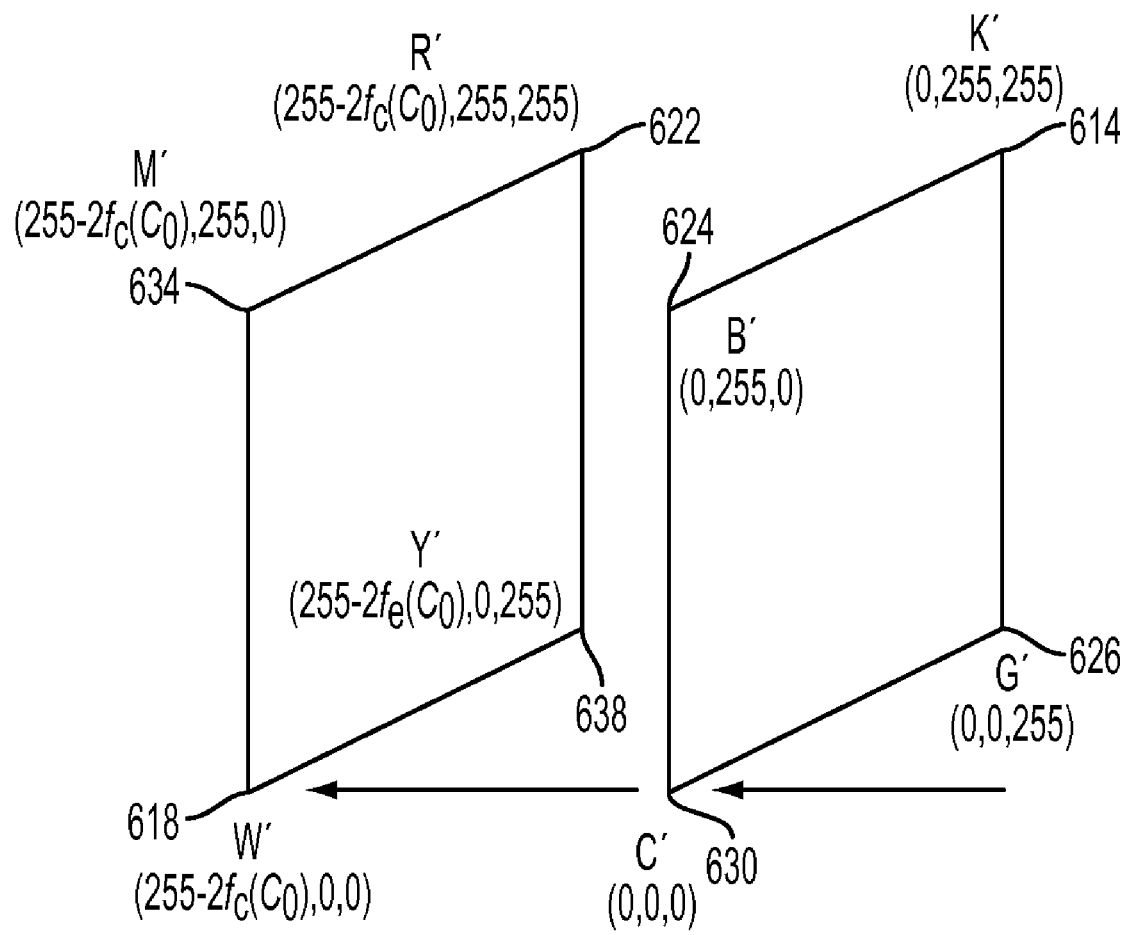
FIG. 6 illustrates an aspect of a relocation of reference point in a marking decision color space.

As illustrated in FIG. 6, when the warping value for a given axis is greater than the contone value representing 100% colorant density (e.g., 255), the associated saturated plane (CBGK, MRBK and/or YRGK) takes the place of the corresponding secondary plane (e.g., RMYW, GCYW or BCMW, respectively) and the associated secondary plane is translated away from its previous position by an amount equal to $2f(\bullet)$ minus the contone value associated with 100% colorant density (e.g., 255) in the same direction that the saturated plane was moved in order to replace the secondary plane. For example, the red plane (RYMW) may be translated by $2f_c(c_0)-255$ in the negative cyan direction from cyan=0 to cyan=$255-2f_c(c_0)$. The green plane (GCYW) may be translated by $2f_m(m_0)-255$ in the negative magenta direction from magenta=0 to magenta=$255-2f_m(m_0)$. The blue plane (BCMW) may be translated by $2f_y(y_0)-255$ in the negative yellow direction from yellow=0 to yellow=$255-2f_y(y_0)$.

For example, if the warping values $2f_i(i_0)$ for all the axes are greater than the contone value associated with 100% colorant density (e.g., 255), then changing 218 location of at least one reference point can include changing the location of the following reference points as indicated below:

$W$: $(c_l,m_l,y_l)=(255-2f_c(c_0),255-2f_m(m_0),255-2f_y(y_0))$ $R$: $(c_l,m_l,y_l)=(255-2f_c(c_0),0,0)$ $G$: $(c_l,m_l,y_l)=(0,255-2f_m(m_0),0)$ $B$: $(c_l,m_l,y_l)=(0,0,255-2f_y(y_0))$ $K$: $(c_l,m_l,y_l)=(0,0,0)$.

Where $(c_l,m_l,y_l)$ is the translated location of the associated reference point.

As another example, and addressing, as an example, only the warping related to the cyan axis, if the warping value $2f_c(c_0)$ is greater than the contone value associated with 100% area coverage (e.g., 255), the saturated cyan plane (CBGK) is translated to the position of the red plane (i.e., RMYW). That is, the new coordinates for C (e.g., 630) are (0,0,0); the new coordinates for B (e.g., 624) are (0,255,0); the new coordinates for G (e.g., 626) are (0,0,255); the new coordinates for K (e.g., 614) are (0,255,255). The Red plane moves $2f_c(c_0)$–255 away from the warped CBGK plane in the Cyan direction. In other words, the new coordinates for W (e.g., 618) are $(255-2f_c(c_0),0,0)$, the new coordinates for M (e.g., 634) are $(255-2f_c(c_0),255,0)$; the new coordinates for Y (e.g., 638) are $(255-2f_c(c_0),0,255)$ and the new coordinates for R (e.g., 622) are $(255-2f_c(c_0),255,255)$.

Identifying 222 a point in the warped marking decision space corresponding to the error modified pixel values can include using axes associated with the space to identify a point in relation to the reference points and segmentation boundaries of the space. Since the point being identified 222 corresponds to error modified pixel values, the locating indices can have values that extend beyond the available range of available contone values (e.g., below 0 and above 255). Accordingly, the identified 222 point can be inside or outside boundaries defined by the reference points. Furthermore, since in certain applications, such as that illustrated in FIG. 5, the reference points are moved closer together than they are in the reference definition (e.g., 310), even error modified pixel values that are within the available range of contone values (e.g., 0-255) can be associated with points that are outside the boundaries defined by the changed 218 reference point locations.

Accordingly, returning attention to FIGS. 3 and 5, identifying 222 the point in the warped marking decision space corresponding to the error modified pixel values can include identifying a point inside (e.g., 640, 642, 646) or outside (e.g., 650, 654) boundaries defined by the location of reference points (e.g., 318, 514, 522, 524, 526, 530, 534, 538) of the warped marking decision color space (e.g., 510).

Selecting 226 the marking decision associated with the identified point according to the warped marking decision space (e.g., 510) can include determining a segment of the warped space that the identified 222 point is included within. For example, a first point 640 may be included in the segment associated with placing a mark using only a magenta colorant. A second point 642 may be associated with a segment corresponding to a marking decision to place a mark using only a yellow colorant. A third point 646 may be associated with a segment of the marking decision color space corresponding to a marking decision to place a mark using only a cyan colorant. Illustrative points 650 and 654, even though they are outside the volume defined by the reference points may also be, for example, included in a segment of the marking decision color space associated with respective marking decisions.

Figure 7:
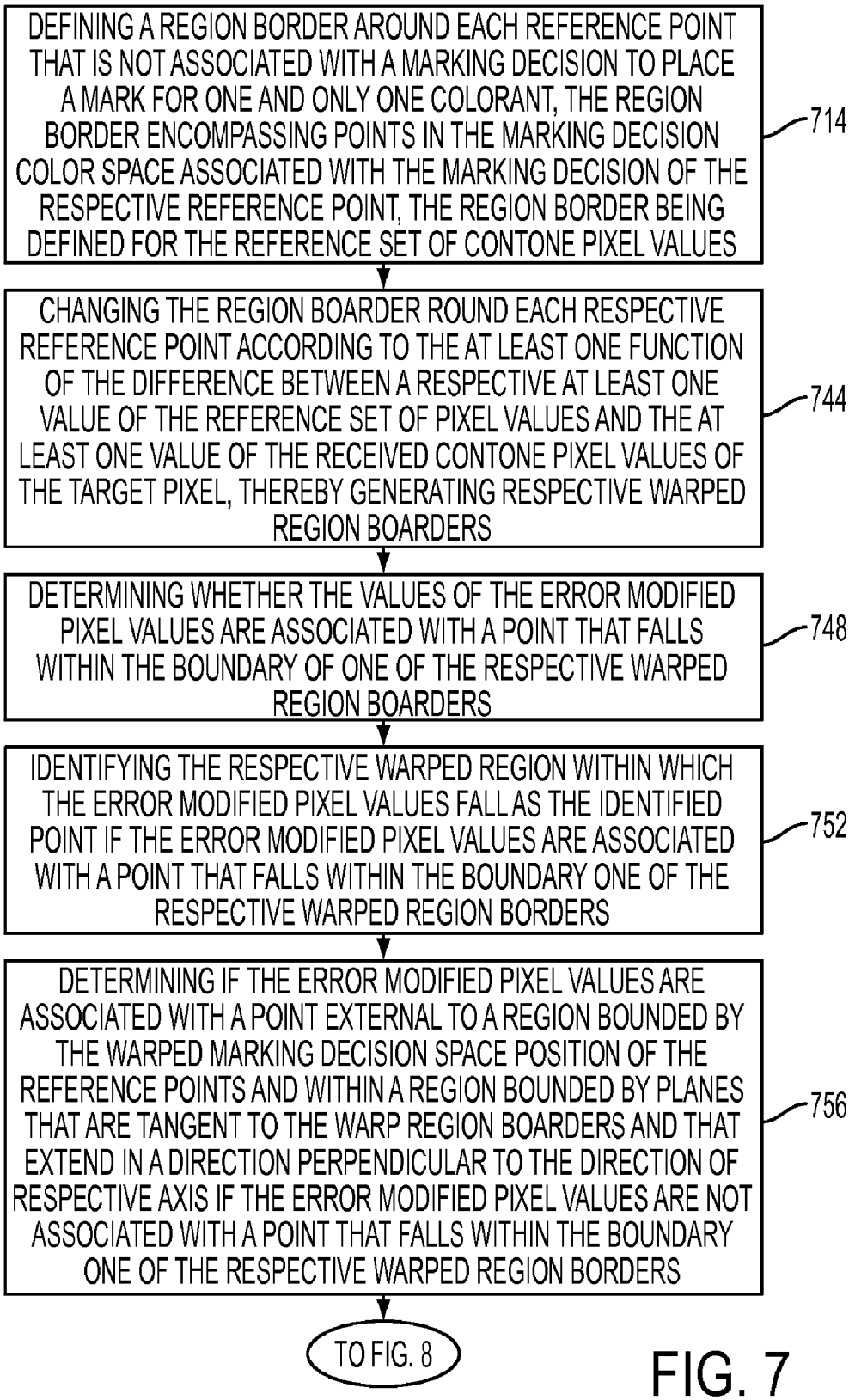

With reference again to FIG. 3 and with reference to FIG. 7, defining 214 a marking decision color space (e.g., 310) can include defining region borders around selected reference points. For example, region borders can be defined 714 around each reference point that is not associated with a marking decision to place a mark for one and only one colorant. For instance, such region borders can encompass points in the marking decision color space associated with the marking decision of the respective reference point. For instance, in the illustrative marking decision color space definition 310 of FIG. 3, respective region borders 650-658 are defined 714 around white 318, red 322, blue 324, green 326, and black 314 reference points of the illustrative marking decision color space 310. In the illustrated embodiment 310, the border regions 650-658 are depicted as equal sized spheres. However, the regions need not be of equal size. The region borders do not need to be the same shape. Furthermore, the region borders can be any regular or irregular shape and may or may not extend into or out of the region bounded by the positions of the reference points of the marking decision color space (e.g., the cube defined by the black, white, red, blue, green, cyan, magenta, yellow reference points 314-338).

As indicated above in the illustrated embodiment, defined 214, 714 marking decision color space 310, the region borders 650-658 are defined 714 around reference points that are not associated with a marking decision to place a mark for one and only one colorant. For instance, the white W 318 reference point is associated with a decision to place no marks and the black K 314 reference point is associated with the decision to place marks using three colorants. The red, green and blue reference points 322-326 are each associated with decisions to place marks using two colorants. Accordingly, in the illustrated marking decision color space 310, the region borders are defined around each reference point that is not associated with a marking decision to place a mark for one and only one colorant. However, other marking decision color space definitions are possible.

For example, instead of segmenting the color space using the planes 346-354, region borders could be defined around the reference points that are associated with marking decisions to place a mark for one and only one colorant (e.g., cyan, magenta and yellow reference points (330-338)).

The defined 714 region borders can serve to define regions of space external to the region bounded by the reference points (e.g., 314-338). For instance, as seen most clearly with regard to region border 650 about the white reference point 318, a region 718 external to the region bounded by the reference point positions may also be associated with the marking decision of its respective reference point (e.g., white 318; no marks). In the illustrated space 310, the region is bounded by planes (e.g., 720-724) that are tangent to the region border (e.g., 650). In the illustrated marking decision color space 310, the planes are perpendicular to respective axes of the marking decision color space 310. For example, a first plane 720 that is perpendicular to the yellow axis (which extends from, for example, the white reference point 318 to the yellow reference point 338). A second plane 722 is perpendicular to the magenta axis which extends, for example, from the white reference point 318 to the magenta reference point 334. A third plane 724 is perpendicular to the cyan axis, which extends, for example, from the white reference point 318 to the cyan reference point 330. Additional regions 726, 728 bounded by planes 730-734 and 736-740, respectively, that are tangent to border regions 650, 658 about the green 326 and black 314 reference points, respectively. First planes 730, 736 are perpendicular to the magenta axis. Second planes 732, 738 are perpendicular to the cyan axis and third 734 and 740 are perpendicular to the yellow axis. Similar regions are associated with the red and blue 322, 324 reference points and are defined by respective region boundaries 652, 654. However, for reasons of clarity, they are not depicted in FIG. 3.

While these external regions (e.g., 718, 726, 728) are depicted as being bound by planes tangential to their respective region borders 650, 656, 658, other region shapes are possible. For instance, conical regions with boundaries radiating outward from the region borders could be used. The size and shape of the various regions (e.g., 650-658 and 718, 726, 728) have a bearing on the marking decisions selected 126 during the processing of a given image. Accordingly, the shapes and sizes of the regions or subdivisions of a particular marking decision color space can be selected on an application-by-application basis.

In embodiments wherein the marking decision color space definition (e.g., 310) includes region border definitions (e.g., 714), those region borders can be changed 744 as the locations of their respective reference points are changed 218. For instance, the region borders (e.g., 650-658) can be changed 744 according to the at least one function of the difference between a respective at least one value of the reference set of pixel values and the at least one value of the received contone pixel values of the target pixel. Such region border changes 744 generate respective warped region borders.

Case (a) (with Region Borders Around Reference Points)

For example, a compression factor based on the function of the difference between the respective at least one value of the reference set of pixel values and the at least one value of the received contone pixel values can be calculated. For instance, where the warping or translation value ($2f(\cdot)$) is less than or equal to the contone value associated with 100% area coverage (e.g., 255), the compression factor can be calculated to be the difference between that contone value and the warping value divided by that contone value (e.g., $255-2f(\cdot)/255$). Accordingly, a compression factor associated with the axis of the illustrative marking decision color space 310 can be calculated to be:

$WC$ axis: $k_c=(255-2f_c(c_0))/255$ $WM$ axis: $k_m=(255-2f_m(m_0))/255$ $WY$ axis: $k_y=(255-2f_y(y_0))/255$.

Changing 744 the border regions can change their shapes. For instance, in the illustrated spherical example, the spheres may become ellipsoids. In extreme cases, one or more dimensions may be reduced to zero changing the spheres to ellipses, lines or single points. In the illustrated spherical case, the border regions can be described by the following equation:

$(c-c_l)^2/(rk_c)^2+(m-m_l)^2/(rk_m)^2+(y-y_l)^2/(rk_y)^2=1$.

Where the subscript l refers to location and where ($c_l$, $m_l$, $y_l$) is the changed 218 location of the reference point surrounded by the border region being considered. It should be noted that where the warping value is zero, the "changed" 218 location of the reference point may be the same location as that associated with the original definition (e.g., 310).

As indicated above, when the warping value for one or more axes is equal to the original length of the axis or contone value associated with 100% area coverage (e.g., 255), the secondary plane and its corresponding saturated plane overlap each other, and the width of the ellipsoids in those directions or dimensions is equal to zero. Therefore, the ellipsoids become either a 2D ellipse (e.g., when one warping value is 255), a straight line (e.g., when two warping values are 255), or a single point in space (e.g., when all three warping values are 255). In those special cases, the general equation for the region border is adapted by dropping the term corresponding to the direction in which the warping value is 255. For example, when the warping value $2f_c(c_0)=255$, the resulting ellipse equation is $(m-m_l)^2/(rk_m)^2+(y-y_l)^2/(rk_y)^2=1$. When the warping values $2f_c(c_0)=255$ and $2f_m(m_0)=255$, the resulting line or interval equation is $(y-y_l)^2/(rk_y)^2=1$. When all three warping values equal 255, all of the points of the marking decision color space overlap and the space becomes a single point in space at (0, 0, 0).

Case (b) with Region Borders Around Reference Points

If the warping value $2f_r(i_0)$ is greater than the defined axis length or contone value associated with 100% area coverage (e.g., 255) for some colorant the terms of the compression factor calculation can be arranged to ensure that the compression factor (e.g., $k_i=(2f_i(i_0)-255)/255$) is positive. However, if the compression factor is used to change spherical region borders as described above, and is therefore used only in terms that are squared, this rearrangement is not absolutely necessary.

Once a marking decision color space has been warped or the locations of reference points have been changed 218 and region borders have been changed 714 (if such region borders (e.g., 650-658) have been included (e.g., 714) in a marking decision color space definition (e.g., 214)) then, identifying 222 a point or region in the warped marking decision space corresponding to the error modified pixel values can be achieved according to a series of tests or stages.

For example, a first test or stage can include determining 748 whether the values of the error modified pixel values are associated with a point that falls within the boundary of one of the respective warped region borders (e.g., warped or changed 744 version of 650-658) and if it is determined to be so located, identifying 752 the respective warped region within which the error modified pixel values fall as the identified 222 point. If the determination 748 is not made that the values of the error modified pixel values are associated with a point that falls within the boundary of one of the respective warped region borders, a determination 756 can be made as to whether the error modified pixel values are associated with a point external to a region bounded by the warped or changed 218 marking decision space position of the reference points (e.g., 318, 514, 522, 524, 526, 530, 534, 538) and within a region bounded by planes that are tangent to the warped region borders and that extend in a direction perpendicular to the direction of respective axes.

If such a determination 756 is made (e.g., if the error modified pixel values are associated with points of warped versions of regions such as 718, 726, 728), then identifying 222 the point in the warped marking decision space corresponding to the error modified pixel values can include identifying 814 the region (e.g., warped versions of, for example, 718, 726, 728) external to the region bounded by the warped marking decision space position of the reference points and within the region bounded by planes tangent to the warped region borders as the identified 222 point.

If the determination 756 that the error diffused pixels are associated with such an external point (e.g., within warped or changed versions of 718, 726, 728, etc.) is not made, respective distances can be determined 818 to respective reference point positions of the warped marking decision color space. For example, where the region borders are defined 714 to be around reference points that are not associated with a marking decision to place a mark using one and only one colorant, the determination 818 can be of distances to respective reference point positions of the warped marking decision color space that are associated with a marking decision to place a mark for one and only one colorant from the position associated with values of the error modified pixel values.

Once such a determination 818 is made, identifying 222 the point in the warped marking decision space corresponding to the error modified pixel values can include identifying 822 the region associated with the respective reference point position of the warped marking decision color space that is associated with a marking decision to place a mark for one and only one colorant that is closest to the position associated with the values of the error modified pixel values as the identified point.

Various proximity or distance measures can be used to make each of these determinations (e.g., 748, 756, 818).

For example, determining 748 whether the values of the error modified pixel values are associated with a point that falls within the boundary of one of the respective warped regions can be achieved through the use of the ellipsoid equation introduced above.

For example, denoting values of an error diffused pixel as $c_e$, $m_e$, $y_e$ and the location of a particular reference point as $c_l$, $m_l$, $y_l$, then the validity of the following inequality indicates whether the values of the error diffused pixel ($c_e$,$m_e$,$y_e$) is within the warped or changed 714 region border, where r is the original radius of the region border as originally defined (e.g., 310, 714) and $k_c$, $k_m$ and $k_y$ are respective compression factors as discussed above.

$$(c_e-c_l)^2/(rk_c)^2+(m_e-m_l)^2/(rk_m)^2+(y_e-y_l)^2/(rk_y)^2 \leq 1$$

If a determination 748 is made that the error modified pixel values ($c_e$,$m_e$,$y_e$) are associated with a point within a particular region boundary (i.e., the expression above is determined to be true) then that region is identified 752 to be the identified 222 point and the marking decision associated therewith can be selected 226, 126 as the marking decision to be used to render the target pixel.

As indicated above, where the compression factor becomes zero for any given term, that term is removed from consideration. For example, if $2f_i(i_0)=255$ for one i, the i-th term in the ellipsoid equation becomes 0 and the 3-dimensional ellipsoids become 2-dimensional ellipses. For example, when $2f_c(c_0)=255$, the test becomes whether $(m_e-m_l)^2/(rk_m)^2 + (y_e-y_l)^2/(rk_y)^2 \leq 1$ is true for any ellipse. If it is, then the ellipse associated with the respective reference point is identified 752 to be the identified 222 point. If $2f_i(i_0)=255$ for two i, both terms in the ellipsoid equation become 0 and the 3-dimensional ellipsoids become line segments. For example, when $2f_c(c_0)=255$ and $2f_m(m_0)=255$, the test becomes whether $(y_e-y_l)^2/(rk_y)^2 \leq 1$.

Instances where the compression factors for all terms in the ellipsoid inequality are zero, are a special case, since all portions of the marking decision color space reduce to a single point. This special case will be addressed below.

If the error modified pixel values are not associated with a point within a changed 744 region border, then further analysis or testing may be required. For example, a determination can be made as to whether the point associated with the error modified pixel values falls within or external to a region bounded by the warped or changed 218 locations of the reference points (e.g., 318, 514-538). For example, such a determination can be made through a coordinate comparison. For example, if $W_i'$ and $K_i'$ are the ith components of the changed 218 location of the W' and K' reference points, respectively, if $W_c' \leq c_e \leq K_c'$ and $W_m' \leq m_e \leq K_m'$ and $W_y' \leq y_e \leq K_y'$, then ($c_e$, $m_e$, $y_e$) is within the region bounded by the warped or changed 218 locations of the reference points 318, 514-538. Determining whether the error modified pixel values are associated with a point internal to or external to the region bounded by the reference points of a less regularly shaped region may require additional comparisons to coordinates of additional or other reference points.

If a determination is made that the point associated with the error modified pixel values fall within the region defined by the warped or changed 218 locations of the reference points, respective distances to respective reference point positions (e.g., 318, 514, 522, 524, 526, 530, 534, 538) of the warped marking decision color space (e.g., 510) that are associated with a marking decision to place a mark for one and only one colorant, from the position associated with the values of the error modified pixel values can be determined 818. For example, the Euclidian distance from the point associated with the error modified pixel values ($c_e$, $m_e$, $y_e$) can be calculated to each of the cyan 530, magenta 534 and yellow reference points of the warped (e.g., 510) marking decision color space. The region (e.g., one of the regions about 640, 642 or 646) associated with the respective reference point position of the warped marking decision color space that is associated with a marking decision to place a mark for one and only one colorant, that is closest to the position associated with the value of the error modified pixel values ($c_e$, $m_e$, $y_e$) can be identified 822 as the identified 222 point.

If the determination is made that the error modified pixel values are associated with a point external to the region bounded by the changed 218 positions of the reference points, then a determination 756 can be made as to whether the error modified pixel values are associated with a point both external to that region and within a region (e.g., 718, 726, 728) bounded by planes that are tangent to the warped region borders and that extend in a direction perpendicular to the direction of respective axes.

For example, such a determination 756 can be made by one or more sets of coordinate comparisons. For instance:
  i. if one of the following holds:
    1. Exactly two of the following three conditions are true: $c_e \leq w_c$, $m_e \leq w_m$, $y_e \leq w_y$.
    2. The following two conditions are true: $n_e \leq w_n$ and $(p_e-w_p)^2/(rk_p)^2+(q_e-w_q)^2/(rk_q)^2 \leq 1$ where n, p and q are one of c, m and y each and $n \neq p \neq q$, and where ($w_c$,$w_m$,$w_y$) are the coordinates of the warped W 318 reference point, identify 814 the regions (e.g., 718) associated with W 318. If neither holds, perform the next test.
  ii. if one of the following holds:
    1. Exactly two of the following three conditions are true: $c_e \geq t_c$, $m_e \geq t_m$, $y_e \geq t_y$,
The following two conditions are true: $n_e \geq t_n$ and $(p_e-t_p)^2/(rk_p)^2+(q_e-t_q)^2/(rk_q)^2 \leq 1$ where n, p and q are one of c, m and y each and $n \neq p \neq q$, where ($t_c$,$t_m$,$t_y$) are the coordinates of the warped K 514 reference point, identify 814 the region (e.g. 728) associated with K 514. If neither holds, perform the next test.
  iii. if one of the following holds:
    1. Exactly two of the following three conditions are true: $c_e \leq r_c$, $m_e \geq r_m$, $y_e \geq r_y$,
    2. The following two conditions are true: $c_e \leq r_c$ and $(m_e-r_m)^2/(rk_m)^2+(y_e-r_y)^2/(rk_y)^2 \leq 1$,
    3. The following two conditions are true: $n_e \geq t_n$ and $(p_e-t_p)^2/(rk_p)^2+(c_e-t_c)^2/(rk_c)^2 \leq 1$ where n and p are one of m and y each and $n \neq p$,
  where ($r_c$,$r_m$,$r_y$) are the coordinates of the warped R 522 reference point, identify 814 the region associated with R 522. If not, perform the next test.
  iv. if one of the following holds:
    1. Exactly two of the following three conditions are true: $c_e \geq g_c$, $m_e \leq g_m$, $y_e \geq g_y$,
    2. The following two conditions are true: $m_e \leq g_m$ and $(c_e-g_c)^2/(rk_c)^2+(m_e-g_m)^2/(rk_m)^2 \leq 1$,
    3. The following two conditions are true: $n_e \geq g_n$ and $(p_e-g_p)^2/(rk_p)^2+(m_e-g_m)^2/(rk_m)^2 \leq 1$ where n and p are one of c and y each and $n \neq p$,
  where ($g_c$,$g_m$,$g_y$) are the coordinates of the warped G 526 reference point, identify 814 the region associated with G 526. If not, perform the next test.

v. if one of the following holds:
1. Exactly two of the following three conditions are true: $c_e \geq b_c$, $m_e \geq b_m$, $y_e \leq b_y$,
2. The following two conditions are true: $y_e \leq b_y$ and $(c_e-b_c)^2/(rk_c)^2+(m_e-b_m)^2/(rk_m)^2 \leq 1$,
3. The following two conditions are true: $n_e \geq b_n$ and $(p_e-b_p)^2/(rk_p)^2+(y_e-b_y)^2/(rk_y)^2 \leq 1$ where n and p are one of c and m each and n≠p, where ($b_c,b_m,b_y$) are the coordinates of the warped B 524 reference point, identify 814 the region the marking decision associated with B 524. If not, perform the next test.

If the determination was made that the values of the error modified pixel values are associated with a point that is external to the warped region defined by the changed 218 location of the reference points and yet the determination 756 cannot be made that the error modified pixel values are associated with a point within a region bounded by planes that are tangent to the warped region borders and extending in a direction perpendicular to the direction of a respective axis (i.e., not in regions such as warped versions of 718, 726, 728), then the error modified pixel values must be associated with a point associated with a marking decision to place a mark using one and only one colorant. Accordingly, the determination 818 can be made as to which of the warped or changed 218 locations of the reference points is closest to the point associated with the error modified pixel values. Accordingly, while the order in which some of these tests are performed can, to some extent, be selected on the basis of efficiency, which may be a function of likelihood of success and/or computational simplicity, logically, the method may be best understood when the tests are considered in the order outlined in FIGS. 7 and 8.

Special Case

As indicated above, in the illustrated embodiment, if the warping values (e.g., $2f_i(i_0)$) for all the dimensions of the color space are equal to the contone value associated with 100% are coverage (e.g., 255) for each of the axes, then all of the reference points overlap and become co-located at 0,0,0. A marking decision can be selected 126 under these circumstances by identifying an octant of eight octants originating or radiating from 0,0,0 in which the error modified pixel value is located. For example, if $c_e \leq 0$, $m_e \leq 0$ and $y_e \leq 0$, the modified pixel is located in a W octant and the marking decision associated with the W (318) octant should be selected 126. If $c_e > 0$, $m_e \leq 0$ and $y_e \leq 0$, the modified pixel is located in a C octant and the marking decision associated with C (330, 530) should be selected 126. If $c_e \leq 0$, $m_e > 0$ and $y_e \leq 0$, the modified pixel is located in an M octant and the marking decision associated with M (334, 534) should be selected 126. If $c_e \leq 0$, $m_e \leq 0$ and $y_e > 0$, the modified pixel is located in a Y octant and the marking decision associated with Y (338, 538) should be selected 126. If $c_e > 0$, me>0 and $y_e \leq 0$, the modified pixel is located in a B octant and the marking decision associated with B (324, 524) should be selected 126. If $c_e > 0$, $m_e \leq 0$ and $y_e > 0$, the modified pixel is located in a G octant and the marking decision associated with G (326, 526) should be selected 126. If $c_e \leq 0$, $m_e > 0$ and $y_e > 0$, the modified pixel is located in an R octant and the marking decision associated with R (322, 522) should be selected 126. If $c_e > 0$, $m_e > 0$ and $y_e > 0$, the modified pixel is located in a K octant and the marking decision associated with K (314, 514) should be selected 126.

Figure 9:
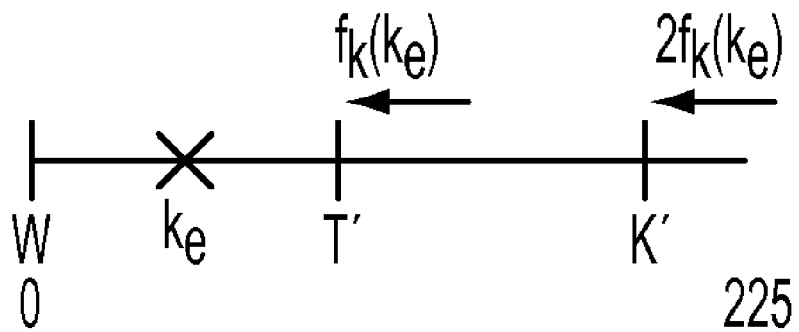
FIGS. 9 and 10 illustrate an equivalency of changing locations of reference points in a marking decision color space and offsetting values of a pixel being processed according to the marking decision color space.
Figure 10:
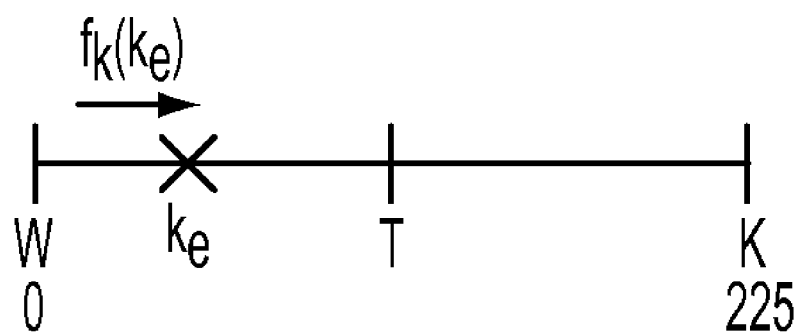

This process results in the selection 126 of a marking decision. As indicated above, that marking decision is associated with a set of contone values, one for each colorant or separation (e.g., the contone values 0 and 255 are associated with decisions to place no mark and to place a mark respectively). Those values are compared to the error modified pixel value being processed to determine a difference. That difference or error is combined 122 with received 114 pixel values from one or more yet-to-be processed pixels from an input image and the process is repeated for each pixel in the image to be processed. For each pixel, the defined 310 marking decision color space is warped or the location of reference points are changed 218 according to a function of pixel values from the target pixel in the input image and that warped space is used to select a marking decision according to the error modified pixel values associated with that target pixel. The method provides the high spatial frequency of mark placement of vector error diffusion while providing the ability to modify edges (enhance or attenuate) which has not been previously provided in vector error diffusion methods. It is noted that these procedures are based on the illustrative marking decision color space definition 310. Other marking decision color space definitions including, for example other segmentations, might call for other marking decision selection procedures. Additionally, while for clarity aspects have been described as part of embodiments of the marking decision selection 126 process, which is repeated for each pixel, not all aspects need be repeated for each pixel. For example, the marking decision color space need only be defined 214 (and optionally 714) once. Furthermore, that same definition may be used to process multiple images. Accordingly, the processing of a particular image is based on a marking decision color space definition, but does not require that the marking decision color space be defined as part of the processing of that particular image Alternative Embodiments As indicated earlier, an alternative implementation of the algorithm warps the error modified pixel values ($c_e$, $m_e$, $y_e$) prior to their input to a static, unwarped marking decision color space. In such embodiments, the warping of input pixel values is in the opposite direction of the warping of the threshold space described above. To understand the logic behind this reasoning, consider the 1D warping case illustrated in FIG. 9 and FIG. 10. FIG. 9 illustrates the case where the input remains unchanged and the decision space is warped. FIG. 10 illustrates the equivalent case where the decision space is left unchanged and the input value is warped.

The equivalency of these two implementations, can be understood by considering three cases, which encompass all possible values for the error modified pixel value $k_e$:

1. $k_e < T' = T - f(k_0)$. In this case, the first implementation would select 126 the marking decision associated with the contone value 0 since $k_e < T'$. The second implementation would select 126 the marking decision associated with the contone value 0 since $k_e' = k_e + f(k_0) < T' + f(k_0) = T$.
2. $k_e > T = T' + f(k_0) > T'$. In this case, the first implementation would select 126 the marking decision associated with the contone value 255 since $k_e > T$. The second implementation would select 126 the marking decision associated with the contone value 255 since $k_e' = k_e + f(k_0) > T + f(k_0) > T$.
3. $T' < k_e < T$. In this case, the first implementation would select 126 the marking decision associated with the contone value 255 since $k_e > T'$. The second implementation would select 126 the marking decision associated with the contone value 255 since $k_e' = k_e + f(k_0) > T' + f(k_0) = T$.

Since cases 1, 2 and 3 cover all possible inputs and the selected 126 the marking decision associated with the contone values of both implementations are the same for all three cases, the methods are equivalent. However, warping the input color rather than the marking decision color space (e.g., 310) may reduce computational complexity.

A multi-dimensional, vector error diffusion embodiment that takes advantage of this alternative approach can be implemented as follows.

A marking decision color space (e.g., 310) can be defined 214 (and optionally, 714) as described above. For example, reference points can be located at the extremes of ranges of available colorants. For example: reference points can be associated with the perceived colors white, cyan, magenta, yellow, red, green, blue and black as follows:

$W, (c_0, m_0, y_0) = (0,0,0)$ $C, (c_0, m_0, y_0) = (255,0,0)$ $M, (c_0, m_0, y_0) = (0,255,0)$ $Y, (c_0, m_0, y_0) = (0,0,255)$ $R, (c_0, m_0, y_0) = (0,255,255)$ $G, (c_0, m_0, y_0) = (255,0,255)$ $B, (c_0, m_0, y_0) = (255,255,0)$ $K, (c_0, m_0, y_0) = (255,255,255)$

As in the previously described implementation or embodiment, region borders can be defined around each of selected reference points. For example, region borders can be defined 714 around each reference point that is not associated with a marking decision to place a mark for one and only one colorant. For example, spheres can be defined around reference points associated with secondary and tertiary colors (e.g., in the illustrated color space: red, green, blue, white and black).

Additionally, as in the earlier described embodiment, a marking decision is selected 126 based on both an error modified pixel value and at least one function of at least one value of the received target pixel contone values. For instance, warping functions are again defined with regard to axes of the defined 214 marking decision color space (e.g., 310). Where the marking decision color space is defined in terms of cyan, magenta, and yellow axes, warping functions can be denoted as $f_c(\bullet)$, $f_m(\bullet)$, and $f_y(\bullet)$. In this alternative embodiment, the warping functions are not used to warp or change 218, 744 aspects of the marking decision color space, but are instead used to warp or modify values of error modified pixel values. For instance, the warping functions are used to generate offsets to the error modified pixel values as indicated in the expression below.

$(c_e', m_e', y_e') = (c_e, m_e, y_e) + (f_c(c_0), f_m(m_0), f_y(y_0))$

The modified error modified pixel values can then be tested to determine which region of the marking decision color space the modified values are associated with. For instance, if the marking decision color space was defined 714 to include region borders around selected reference points, tests can be performed to determine if the modified error modified pixel value is associated with a point within any of the defined 714 region borders (e.g., 650-658). For instance, where the region borders are spherical, the following inequality can be used to test whether the modified error modified pixel values fall within a particular one of the defined 714 region borders: $(c_e' - c_0)^2 + (m_e' - m_0)^2 + (y_e' - y_0)^2 \leq r_0^2$, wherein $c_0, m_0, y_0$ identify the location of the selected reference point; $c_e', m_e', y_e'$ are respective values of the modified error modified pixel values; and $r_0^2$ is the radius of the particular defined 714 region border.

If the expression is true for a particular reference point and modified pixel value, then the modified error modified pixel value is associated with a point within the particular region border and a marking decision can be selected 126 to be the marking decision associated with the reference point and/or associated region border. If the expression is not true for any of the defined 714 region borders, then further testing may be necessary.

For instance, a determination, similar to the determination 756 as to whether the modified error modified pixel values are associated with a point external to a region bounded by the marking decision color space reference points (e.g., 314, 318, 322, 326, 330, 334, 338) and within regions bounded by planes that are tangent to the region borders and that are perpendicular to the direction of respective axes (e.g., within 718, 726, 728, etc.) can be made.

For example, if a determination is made that the modified error modified pixel values are associated with a point external to the region bounded by the marking decision color space position of the reference points (e.g., external to the cube defined by the reference points 314-338) and if the radius of each defined 714 region border is r, then the following tests can be performed to identify a point equivalent to the identification 222 of the point in the warped marking decision space corresponding to the error modified pixel values by instead identifying a warped point in the unwarped marking decision color space.

i. if one of the following holds:
 1. Exactly two of the following three conditions are true:
  $c_e' \leq 0$, $m_e' \leq 0$, $y_e' \leq 0$,
 2. The following two conditions are true: $n_e \leq 0$ and $p_e^2 + q_e^2 \leq r_0^2$ where n, p and q are one of c, m and y each and $n \neq p \neq q$, identify the region (e.g., 718) associated with W 318. If not, perform the next test.

ii. if one of the following holds:
 1. Exactly two of the following three conditions are true:
  $c_e' \geq 255$, $m_e' \geq 255$, $y_e' \geq 255$,
 2. The following two conditions are true: $n_e \geq 255$ and $(p_e - 255)^2 + (q_e - 255)^2 \leq r_0^2$ where n, p and q are one of c', m' and y' each and $n \neq p \neq q$, identify the region (e.g., 728) associated with K 314. If not, perform the next test.

iii. In a manner similar to that described with regard to 814, if one of the following holds:
 1. Exactly two of the following three conditions are true:
  $c_e' \leq 0$, $m_e' \geq 255$, $y_e' \geq 255$
 2. The following two conditions are true: $c_e' \leq 0$ and $(m_e' - 255)^2 + (y_e' - 255)^2 \leq r_0^2$,
 3. The following two conditions are true: $n_e \geq 255$ and $(p_e - 255)^2 + (c_e - 255)^2 \leq r_0^2$, where n and p are one of m' and y' each and $n \neq p$, identify the region associated with R 322. If not, perform the next test.

iv. In a manner similar to that described with regard to 814, if one of the following holds:
 1. Exactly two of the following three conditions are true:
  $c_e' \geq 255$, $m_e' \leq 0$, $y_e' \geq 255$,
 2. The following two conditions are true: $m_e' \leq 0$ and $(c_e' - 255)^2 + (y_e' - 255)^2 \leq r_0^2$,
 3. The following two conditions are true: $n_e \geq 255$ and $(p_e - 255)^2 + (m_e - 255)^2 \leq r_0^2$ where n and p are one of c' and y' each and $n \neq p$, identify the region (e.g., 726) associated with G 326. If not, perform the next test.

v. In a manner similar to that described with regard to 814, if one of the following holds:
 1. Exactly two of the following three conditions are true:
  $c_e' \geq 255$, $m_e' \geq 255$, $y_e' \leq 0$, 2. The following two conditions are true: $y_e' \leq 0$ and $(c_e'-255)^2+(m_e'-255)^2 \leq r_0^2$,
3. The following two conditions are true: $n_e \geq 255$ and $(p_e-255)^2+(y_e-255)^2 \leq r_0^2$ where n and p are one of c' and m' each and n≠p, identify the region associated with B 324. If not, perform the next test.

If it is determined that the modified error modified pixel values is external to the region defined by the reference points but is not included in any of the regions defined by planes that are tangent to the defined 714 region boundaries, then the modified error modified pixel value must be associated with a region associated with a primary reference point. That is, in the illustrative example, the modified error modified pixel value must be associated with a point in the marking decision color space 310 that is associated with a marking decision to place a mark using one and only one colorant (e.g., the C 330, M 334 or Y 338 reference point). Which point can be determined by computing, for example, the Euclidean distance between a point associated with the modified error modified pixel values and each of the reference points (e.g., 330-338). The reference point associated with the shortest distance can be identified in a manner equivalent to the identification 222 of a point in the warped marking decision space as corresponding to the modified error modified pixel values.

If a determination is made that the modified error modified pixel values are associated with a point that falls within the region defined by the reference points (e.g., within the cube of the defined marking decision color space 310), then, again, distances to each of the primary reference points can be determined in a manner similar to that described with regard to the determination 818 of respective distances to respective reference point positions of the warped marking decision color space. However, in this case, the determination would be of distances of a warped position of warped error modified pixel values to unwarped or original positions (e.g., 330-338) of the primary reference points or reference points associated with a marking decision to place a mark for one and only one colorant.

Again, the determination as to whether the modified error modified pixel values are associated with a point that falls within or is external to the region bounded by the reference points (e.g., 314-338) can be achieved through a comparison of coordinates. For instance, if $0 \leq c_e' \leq 255$ and $0 \leq m_e' \leq 255$ and $0 \leq y_e' \leq 255$, then $(c_e', m_e', y_e')$ is within the region defined by the reference points. It is noted that these procedures are based on the illustrative marking decision color space definition 310. Other marking decision color space definitions including, for example other segmentations, might call for other marking decision selection procedures. Additionally, while for clarity aspects have been described as part of embodiments of the marking decision selection 126 process, which is repeated for each pixel, not all aspects need be repeated for each pixel. For example, the marking decision color space need only be defined 214 (and optionally 714) once. Furthermore, that same definition may be used to process multiple images. Accordingly, the processing of a particular image is based on a marking decision color space definition, but does not require that the marking decision color space be defined as part of the processing of that particular image.

As in the earlier described embodiments, once a point has been identified, the marking decision associated with the identified point can be selected 226, an error associated with the marking decision can be determined 130 and stored 134 for further processing and the marking decision can be stored or rendered 138 according to the rest of the vector error diffusion process.

Systems that can carry out embodiments of the method 110 for transforming a color contone description of an image into a reduced quantization version of the image can be implemented according to various arrangements of functional blocks achieved through various combinations of hardware and software. Images can be received 114 via computer communication systems including network connections and storage media. Furthermore, image input means can include scanners and/or cameras. Computational elements can include computer processors, microprocessors, application specific integrated circuits (ASIC), digital signal processors and other devices. Data can be stored before, during and after processing according to the method 110 in computer memory devices and bulk storage devices including, but not limited to, RAM, ROM, EEPROM, FLASH, memory sticks, memory cards, rotating media such as magnetic disks, optical disks and in network based storage devices. Functional blocks and/or components can be located in a single device or distributed over a wide geographical area while interacting through communication devices including telephone or computer networks.

Figure 11:
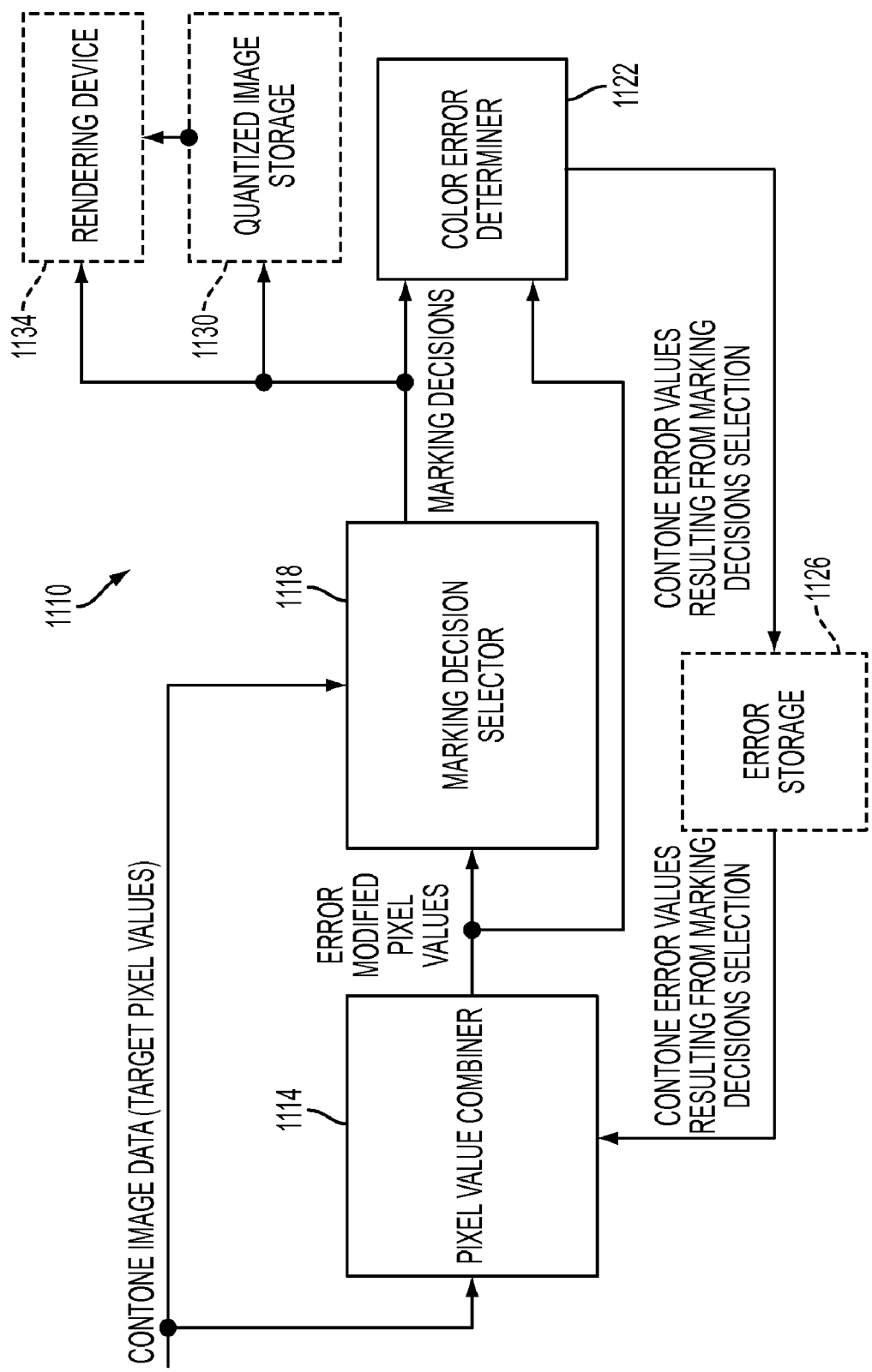
FIG. 11 is a block diagram depicting an embodiment of a system, such as an image processing device, that is operative to perform embodiments of the method of FIG. 1.

For example, referring to FIG. 11, an illustrative system 1110 can include a pixel value combiner 1114, a marking decision selector 1118 and a color error determiner 1122.

For instance, the pixel value combiner 1114 receives 114 contone pixel values of a target color pixel from an image to be processed or quantized. The pixel value combiner 1114 also receives 118 color contone error values. The color contone error values may be received 118 from an error storage device 1126 or directly from the color error determiner 1122. Depending on the particular form of vector error diffusion being applied, the error may be an initial default error value for use in processing a first pixel, error from the processing of one previously processed pixel or a combination of error or proportions of error from the processing of a plurality of previously processed pixels. The received 118 error values are combined 122 with the received 114 target pixel contone values. For example, errors associated with respective color or colorant separations are combined through, for example, addition or subtraction with respective contone values associated with the respective color or colorant separations of the target pixel contone values.

The marking decision selector 1118 receives the combined 122 values in the form of error modified pixel values. Additionally, the marking decision selector 1118 receives 114 the contone pixel values of the target color pixel. Accordingly, the marking decision selector 118 is able to select 126 a marking decision for the target color pixel based on both the error modified pixel values from the pixel value combiner 1114 and at least one function of at least one value of the received target pixel contone values. The marking decision selector 1118 makes the selection according to vector error diffusion techniques. Accordingly, an error modified pixel value regarding at least a first colorant can be a factor in selecting a marking decision regarding at least the second colorant (e.g., see FIG. 3 or FIG. 5 wherein for a given contone value associated with cyan contone values associated with magenta and/or yellow can change the marking decision selected for cyan).

For example, the marking decision selector 1118 can define 214 or include a defined 214 marking decision color space (e.g., 310) relating marking decisions to contone values regarding a plurality of colorants, the color space being defined, at least in part, by respective reference points (e.g., 314-338). For instance, the reference points can be associated with respective extremes of ranges of available contone values and therefore with respective marking decisions having zero error, wherein the marking decision color space associates respective subsets of sets of contone pixel values with marking decisions of respective ones of the respective reference points and wherein the marking decision color space and associated marking decisions being associated with a referenced set of contone pixel values. For example, in the illustrated embodiment, the illustrative marking decision color space 310 is associated with a referenced set of contone pixel values calling for zero area coverage for each of cyan, magenta and yellow colorants (i.e., c=0, m=0, y=0) for a white color (assuming a white paper or rendering media).

Using that defined (e.g., 310) marking decision color space as a starting point, the marking decision selector 1118 can then change 218 the location of at least one reference point in the marking decision color space according to a function of a difference between the referenced set of contone pixel values (e.g., white) and the contone pixel values of the target pixel. Such a location change results in a change in the distance in the marking decision color space between respective subsets of contone pixel values and the relocated reference point or points. Accordingly, the marking decision associated with at least one set of contone pixel values is changed by this relocation 218.

In some embodiments, the marking decision selector defines 214 or includes a defined 214 marking decision color space wherein region borders are defined 714 around selected reference points. For example, the border regions can be defined around reference points that are not associated with a marking decision to place a mark for one and only one colorant. For instance, in the illustrative marking decision color space region borders 650-658 are defined around reference associated with marking decisions to place marks using two, three or zero colorants. Region borders encompass points in the marking decision color space to be associated with the marking decision of the respective reference point. Again, the original region border definitions 714 are associated with the reference set of contone pixel values (e.g., white; c=0, m=0, y=0). In such embodiments, the marking decision selector 1118 may also change 744 the region border around each respective reference point associated with a region border according to at least one function of a difference between a respective at least one value of the reference set of pixel values and the at least one value of the received contone pixel values of the target pixel. Such region border changing 744 generates respective warped region borders.

Alternatively, instead of changing the location of reference points and/or the shape of region borders, the marking decision selector 1118 can equivalently use a function of the difference between the reference set of contone pixel values and one or more pixels of the target pixel to warp or modify the values of the axes of the marking decision color space 318 or to change, modify or warp the error modified pixel values resulting from the combination 122 of the received target pixel contone values and the error contone values.

Once the position of the reference points and if included, the region borders are changed (e.g., 218, 744) or equivalently once the axes or error modified pixel values are changed, a point is identified in the marking decision color space (e.g., in the warped marking decision color space (e.g., 510) or where the error modified pixel value is changed, in the unwarped marking decision color space (e.g., 310)) that corresponds to the error modified pixel values (or warped or changed error modified pixel values) and a marking decision associated with that point is selected (e.g., 126, 226).

For instance, in embodiments wherein the location of at least one reference point is changed 218 and wherein region borders around respective reference points are changed 744, the marking decision selector 1118 can determine 748 whether the values of the error modified pixel values are associated with a point that falls within the boundary of one of the respective warped region borders. If so, the respective warped region is identified as the identified 222 point and the marking decision associated with the identified region border is selected 226 as the selected 126 marking decision.

If the embodiment does not include a definition 714 of region borders, or if the embodiment does include a definition 714 of region borders but it is not determined 748 that values of the error modified pixel values are associated with a point that falls within the boundary of one of the respective warped border regions, then the marking decision selector 1118 may attempt to determine 756 if the error modified pixel values are associated with a point external to a region bounded by the warped or changed 218 marking decision space position of the reference points and within a region bounded by planes that are tangent to the warped region borders and that extend in a direction perpendicular to the direction of respective axes.

If such a determination 756 is made by the marking decision selector 1118, then identifying 222 the point in the warped marking decision space corresponding to the error modified pixel values can include identifying 814 the region external to the region bounded by the warped marking decision space position of the reference points and within the region bounded by planes tangent to the warped region borders as the identified point. If such a determination 756 is not made by the marking decision selector 1118, then respective distances of a point associated with the error modified pixel values to respective reference points can be determined.

For instance, where the region borders are defined 714 to be around each reference point that is not associated with a marking decision to place a mark for one and only one colorant, respective distances can be determined to the remaining reference points, i.e., those that are associated with a marking decision to place a mark using one and only one colorant. In such instances, the marking decision selector 1118 can identify 222 the point in the marked warping decision space corresponding to the error modified pixel values by identifying a region associated with the respective reference point of the warped marking decision color space that is closest to the position associated with the error modified pixel values.

In embodiments wherein the marking decision selector 1118 does not warp or change 218 the location of at least one reference point but instead warps or modifies or changes axes or error modified pixel values, a point in the unwarped or originally defined 214 marking decision color space is identified in a manner similar to that described with regard to identifying 222 the point in the warped marking decision space. However, the determinations or tests are made with regard to the defined 214/714 marking decision color space and a warped or modified axes and/or warped or modified error modified pixel values.

The marking decision selector 1118 may deliver the selected 226 marking decision to a quantized image storage device 1130 and/or to a rendering device 1134. For instance, the quantized image storage 1130 may be a computer memory or mass storage device where the marking decision may be accumulated with other marking decisions related to other input image pixels and from where the quantized image may be further processed. The rendering device 1134 may be a printer or display device.

The color error determiner 1122 also receives the selected 226 marking decision from the marking decision selector 1118. The color error determiner 1122 also receives the associated error modified pixel values from the pixel value combiner and compares contone pixel values associated with the marking decisions to the error modified pixel values. Differences between those values are considered error which is either stored in the error storage device 1126 or passed directly to the pixel value combiner to be combined in with values from one or more subsequently processed pixels received 114 from an image data source.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. The phrase "rendering device" or "printer" as used herein encompasses any apparatus such as a digital copier, book making machine, facsimile machine, multi-function machine, display, etc. which performs a quantized print outputting or display function for any purpose.

What is claimed is:

1. A method for transforming a color contone description of an image into a reduced quantization version of the image according to a desired edge modification, the method comprising:
    for each contone pixel in the image, selecting the contone pixel as a target pixel:
        receiving contone pixel values of the target pixel of the image which call for colorant densities of a plurality of colorants of an associated image rendering device, the plurality of colorants including a first colorant associated with at least a first pixel value of the target pixel and a second colorant associated with at least a second pixel value of the target pixel;
        receiving contone color error values associated with marking decisions made in regard to at least one previously processed contone pixel of the image or initial contone error values;
        combining the contone pixel values with the contone error values, thereby generating a set of error modified pixel values;
        selecting marking decisions based on the set of error modified pixel values and at least one function of at least one of the received contone pixel values of the target pixel, wherein a color error modified pixel value associated with at least the first colorant is a factor in selecting a marking decision regarding at least the second colorant, wherein marking decisions for a given pixel may sacrifice color accuracy in favor of placing a mark for a given set of error modified pixel values and wherein the at least one function biases the marking decision associated with a respective error modified pixel value toward making a mark as a respective value of the received contone pixel values increases in darkness when the desired edge modification is an edge enhancement and wherein the at least one function biases the marking decision associated with a respective error modified pixel value away from making a mark as a respective value of the received contone pixel values decreases in darkness when the desired edge modification is an edge attenuation;
        determining color error associated with the selected marking decision;
        storing the determined color error for use in processing a subsequent pixel of the contone image;
        at least one of storing or rendering the selected marking decisions;
    thereby transforming the image into a reduced quantization version of the image.

2. The method of claim 1 comprising rendering the reduced quantization version of the image according to the selected marking decisions.

3. The method of claim 1 comprising:
    defining a marking decision color space that relates sets of color contone pixel values to sets of reduced quantization marking decisions regarding the plurality of colorants, the marking decision space being defined, at least in part, by respective reference points, the respective reference points being those points in the marking decision space that correspond to respective extremes of a range of available contone pixel values and therefore corresponding to marking decisions associated with zero marking decision error for the respective corresponding pixel values, the marking decision space definition associating respective subsets of sets of contone pixel values with the marking decision associated with respective ones of the respective reference points based on respective functions of distance in the color space of points identified by the sets contone pixel values to the respective ones of the reference points, the marking decision color space and associated marking decision associations being associated with a reference set of contone pixel values;
    wherein selecting the marking decisions based on the error modified pixel values and the at least one function of the at least one value of the received contone pixel values of the target pixel comprises:
        changing at least one respective location of at least one respective reference point in the marking decision color space according to at least one function of a difference between the reference set of contone pixel values and the contone pixel values of the target pixel, thereby changing the distance in the marking decision color space between points associated with at least one of the respective subsets of contone pixel values and the at least one reference point and therefore changing at least one marking decision associated with at least one set of contone pixels values, wherein each respective colorant of the plurality of colorants is associated with a respective axis in the marking decision color space and wherein a respective function of the at least one function changes the respective location of the at least one reference point along the respective axis of the respective colorant in a direction along the respective axis that corresponds to an edge enhancement or edge attenuation effect, thereby generating a warped marking decision space;
        identifying a point in the warped marking decision space corresponding to the error modified pixel values; and
        selecting the marking decisions associated with the identified point according to the warped marking decision space.

4. The method of claim 3 comprising:
    defining a region border around each reference point that is not associated with a marking decision to place a mark for one and only one colorant, the region border encompassing points in the marking decision color space associated with the marking decision of the respective reference point, the region border being defined for the reference set of contone pixel values;

changing the region boarder round each respective reference point that is not associated with a marking decision to place a mark for one and only one colorant according to the at least one function of the difference between a respective at least one value of the reference set of pixel values and the at least one value of the received contone pixel values of the target pixel, thereby warping each respective region boarder to define a respective warped region boarder;

wherein identifying the point in the warped marking decision space corresponding to the error modified pixel values comprises:

determining whether the values of the error-diffused pixel values are associated with a point that falls within the boundary of one of the respective warped region boarders;

identifying the respective warped region within which the error modified pixel values fall as the identified point if the error modified pixel values are associated with a point that falls within the boundary one of the respective warped region borders;

determining if the error modified pixel values are associated with a point external to a region bounded by the warped marking decision space position of the reference points and within a region bounded by planes that are tangent to the warp region boarders associated with a reference point that is not associated with a marking decision to place a mark for one and only one colorant and that extend in a direction perpendicular to the direction of respective axis if the error modified pixel values are not associated with a point that falls within the boundary one of the respective warped region borders;

identifying the region external to the region bounded by the warped marking decision space position of the reference points and within the region bounded by planes extending that are tangent to the warped region borders associated with a reference point that is not associated with the marking decision to place the mark for one and only one colorant and that extend in a direction perpendicular to the direction of respective axis, as the identified point if the error modified pixel values are not associated with a point that falls within the boundary of the respective warped region borders and the error modified pixel values are associated with the point external to the region bounded by the warped marking decision space position of the reference points and within the region bounded by planes that are tangent to the warped region borders associated with the reference point that is not associated with a marking decision to place a mark for one and only one colorant and that extend in a direction perpendicular to the direction of respective axis determining respective distances to respective reference point positions of the warped marking decision color space that are associated with a marking decision to place a mark for one and only one colorant from the position associated with the values of the error modified pixel values if the error modified pixel values are associated with a position that does not fall within the boundary one of the respective warped region boarders and if the error modified pixel values are not associated with the point external to the region bounded by the warped marking decision space position of the reference points and within the region bounded by planes that are tangent to the warped region borders associated with the reference point that is not associated with a marking decision to place a mark for one and only one colorant and that extend in a direction perpendicular to the direction of respective axis; and identifying a region associated with the respective reference point position of the warped marking decision color space that is associated with a marking decision to place a mark for one and only one colorant that is closest to the position associated with the values of the error modified pixel values as the identified point if the error modified pixel values are associated with a position that does not fall within the boundary one of the respective warped region boarders and if the error modified pixel values are not associated with the point external to the region bounded by the warped marking decision space position of the reference points and within the region bounded by planes that are tangent to the warped region borders associated with the reference point that is not associated with a marking decision to place a mark for one and only one colorant and that extend in a direction perpendicular to the direction of respective axis.

5. The method of claim 1 comprising:

defining a marking decision color space that relates sets of color contone pixel values to sets of reduced quantization marking decisions regarding the plurality of colorants, the marking decision space being defined, at least in part, by respective reference points, the respective reference points being those points in the marking decision space that correspond to respective extremes of a range of available contone pixel values and therefore corresponding to marking decisions associated with zero marking decision error for the respective corresponding pixel values, the marking decision space definition associating respective subsets of sets of contone pixel values with the marking decision associated with respective ones of the respective reference points based on respective functions of distance in the color space of points identified by the sets of contone pixel values to respective ones of the respective reference points;

wherein selecting the marking decisions based on the error modified pixel values and the at least one function of the at least one value of the received contone pixel values of the target pixel comprises:

combining at least one value of the error modified pixel values with a respective value of the at least one function, thereby generating a warped error modified pixel value;

identifying a point in the marking decision color space corresponding to the warped error modified pixel values; and selecting the marking decisions associated with the identified point according to the identified point.

6. The method of claim 5 wherein combining at least one value of the error modified pixel values with a respective value of the at least one function comprises:

subtracting a value of the at least one function from a value of the error modified pixel values.

7. The method of claim 1 wherein at least one of the at least one functions is at least one of: a linear function of only one colorant value of the received contone pixel values of the target pixel wherein the colorant value is the respective colorant value associated with the respective axis and, a linear function of two colorant values of the received contone pixel values wherein one of the two colorant values is the respective colorant value associated with the respective axis.

8. An image processing system that is operative to transform a color contone description of an image into a reduced quantization version of the image according to a desired edge modification, the system comprising:
- a pixel value combiner that is operative to receive contone pixel values of target pixels of the image which call for colorant densities of a plurality of colorants of an associated image rendering device, the plurality of colorants including a first colorant associated with at least a first pixel value of the target pixel and a second colorant associated with at least a second pixel value of the target pixel, to receive contone color error values associated with marking decisions made in regard to a previously processed contone pixel of the image or initial contone error values and to combining the contone pixel values with the contone error values, thereby generating a sets of error modified pixel values;
- a marking decision selector that is operative to select marking decisions based on the sets of error modified pixel values and at least one function of at least one of the received contone pixel values of the target pixels, wherein an error modified pixel value of a target pixel associated with at least the first colorant is a factor in selecting a marking decision regarding at least the second colorant of the target pixel, wherein marking decisions for a given pixel may sacrifice color accuracy in favor of placing a mark for a given set of error modified pixel values and wherein the at least one function biases the marking decision associated with a respective error modified pixel value toward making a mark as a respective value of the received contone pixel values increases in darkness when the desired edge modification is an edge enhancement and wherein the at least one function biases the marking decision associated with a respective error modified pixel value away from making a mark as a respective value of the received contone pixel values decreases in darkness when the desired edge modification is an edge attenuation; and
- a color error determiner that is operative to determine color error associated with each selected marking decision and make contone color error values describing the determined color error available for the processing of at least one subsequently selected target pixel.

9. The image processing system of claim 8 comprising:
a marking decision color space that relates sets of color contone pixel values to sets of reduced quantization marking decisions regarding the plurality of colorants, the marking decision space being defined, at least in part, by respective reference points, the respective reference points being those points in the marking decision space that correspond to respective extremes of a range of available contone pixel values and therefore corresponding to marking decisions associated with zero marking decision error for the respective corresponding pixel values, the marking decision space definition associating respective subsets of sets of contone pixel values with the marking decision associated with respective ones of the respective reference points based on respective functions of distance in the color space of points identified by the sets contone pixel values to the respective ones of the reference points, the marking decision color space and associated marking decision associations being associated with a reference set of contone pixel values; and
wherein the marking decision selector is operative to select the marking decisions based on the error modified pixel values and the at least one function of at least one value of the received contone pixel values of the target pixel changing at least one respective location of at least one respective reference point in the marking decision color space according to at least one function of a difference between the reference set of contone pixel values and the contone pixel values of the target pixel, thereby changing the distance in the marking decision color space between points associated with at least one of the respective subsets of contone pixel values and the at least one reference point and therefore changing at least one marking decision associated with at least one set of contone pixels values, wherein each respective colorant of the plurality of colorants is associated with a respective axis in the marking decision color space and wherein a respective function of the at least one function changes the respective location of the at least one reference point along the respective axis of the respective colorant in a direction along the respective axis that corresponds to an edge enhancement or edge attenuation effect, thereby generating a warped marking decision space, to identify a point in the warped marking decision space corresponding to the error modified pixel values and to select the marking decisions associated with the identified point according to the warped marking decision space.

10. The image processing system of claim 9 wherein the marking decision color space defines a region border around each reference point that is not associated with a marking decision to place a mark for one and only one colorant, the region border encompassing points in the marking decision color space associated with the marking decision of the respective reference point, the region border being defined for the reference set of contone pixel values; and wherein the wherein the marking decision selector is operative to change the region boarder around each respective reference point that is not associated with a marking decision to place a mark for one and only one colorant according to the at least one function of the difference between a respective at least one value of the reference set of pixel values and the at least one value of the received contone pixel values of the target pixel, thereby warping each respective region boarder to define a respective warped region boarder;
wherein the marking decision selector identifies the point in the warped marking decision space corresponding to the error modified pixel values by determining whether the values of the error-diffused pixel values are associated with a point that falls within the boundary of one of the respective warped region boarders, identifying the respective warped region within which the error modified pixel values fall as the identified point if the error modified pixel values are associated with a point that falls within the boundary one of the respective warped region borders, determining if the error modified pixel values are associated with a point external to a region bounded by the warped marking decision space position of the reference points and within a region bounded by planes that are tangent to the warped region borders associated with a reference point that is not associated with a marking decision to place a mark for one and only one colorant and that extend in a direction perpendicular to the direction of respective axis if the error modified pixel values are not associated with a point that falls within the boundary one of the respective warped region borders and identifying the region external to the region bounded by the warped marking decision space position of the reference points and within the region bounded by planes that are tangent to the warped region borders associated with a reference point that is not associated with the marking decision to place the mark for one and only one colorant and that extend in a direction perpendicular to the direction of respective axis as the identified point, if the error modified pixel values are not associated with a point that falls within the boundary one of the respective warped region borders and the error modified pixel values are associated with the point external to the region bounded by the warped marking decision space position of the reference points and within the region bounded by planes extending perpendicular from axis intercepts of the warped region borders associated with the reference point that is not associated with a marking decision to place a mark for one and only one colorant; determining respective distances to respective reference point positions of the warped marking decision color space that are associated with a marking decision to place a mark for one and only one colorant from the position associated with the values of the error modified pixel values if the error modified pixel values are associated with a position that does not fall within the boundary one of the respective warped region boarders and if the error modified pixel values are not associated with the point external to the region bounded by the warped marking decision space position of the reference points and within the region bounded by planes that are tangent to the warped region borders associated with the reference point that is not associated with a marking decision to place a mark for one and only one colorant and that extend in a direction perpendicular to the direction of respective axis and identifying a region associated with the respective reference point position of the warped marking decision color space that is associated with a marking decision to place a mark for one and only one colorant that is closest to the position associated with the values of the error modified pixel values as the identified point if the error modified pixel values are associated with a position that does not fall within the boundary one of the respective warped region boarders and if the error modified pixel values are not associated with the point external to the region bounded by the warped marking decision space position of the reference points and within the region bounded by planes extending perpendicular from axis intercepts of the warped region borders associated with the reference point that is not associated with a marking decision to place a mark for one and only one colorant.

11. The image processing system of claim 8 comprising:
a marking decision color space that relates sets of color contone pixel values to sets of reduced quantization marking decisions regarding the plurality of colorants, the marking decision space being defined, at least in part, by respective reference points, the respective reference points being those points in the marking decision space that correspond to respective extremes of a range of available contone pixel values and therefore corresponding to marking decisions associated with zero marking decision error for the respective corresponding pixel values, the marking decision space definition associating respective subsets of sets of contone pixel values with the marking decision associated with respective ones of the respective reference points based on respective functions of distance in the color space of points identified by the sets of contone pixel values to respective ones of the respective reference points; and
wherein the marking decision selector selects the marking decisions based on the error modified pixel values and the at least one function of the at least one value of the received contone pixel values of the target pixel by combining at least one value of the error modified pixel values with a respective value of the at least one function, thereby generating a warped error modified pixel value, identifying a point in the marking decision color space corresponding to the warped error modified pixel values and selecting the marking decisions associated with the identified point according to the identified point.

12. A method for transforming a color contone description of an image into a reduced quantization version of the image according to a desired edge modification, the method comprising:
defining a marking decision color space that relates sets of color contone pixel values to sets of reduced quantization marking decisions regarding the plurality of colorants, the marking decision space being defined, at least in part, by respective reference points, the respective reference points being those points in the marking decision space that correspond to respective extremes of a range of available contone pixel values and therefore corresponding to marking decisions associated with zero marking decision error for the respective corresponding pixel values, the marking decision space definition associating respective subsets of sets of contone pixel values with the marking decision associated with respective ones of the respective reference points based on respective functions of distance in the color space of points identified by the sets of contone pixel values to respective ones of the respective reference points; and
for each contone pixel in the image, selecting the contone pixel as a target pixel:
receiving contone pixel values of the target pixel of the image which call for colorant densities of a plurality of colorants of an associated image rendering device, the plurality of colorants including a first colorant associated with at least a first pixel value of the target pixel and a second colorant associated with at least a second pixel value of the target pixel;
receiving contone color error values associated with marking decisions made in regard to at least one previously processed contone pixel of the image or initial contone error values;
combining the contone pixel values with the contone error values, thereby generating a set of error modified pixel values;
combining at least one value of the error modified pixel values with a respective value of at least one function of at least one value of the received contone pixel values of the target pixel, thereby generating a warped error modified pixel value;
identifying a point in the marking decision color space corresponding to the warped error modified pixel values;
selecting marking decisions associated with the identified point according to the identified point
determining color error associated with the selected marking decision;
storing the determined color error for use in processing a subsequent pixel of the contone image; and
at least one of storing or rendering the selected marking decisions;
thereby transforming the image into a reduced quantization version of the image.

13. The method of claim 12 wherein combining at least one value of the error modified pixel values with a respective value of the at least one function comprises:

subtracting a value of the at least one function from a value of the error modified pixel values.

14. The method of claim 12 wherein at least one of the at least one functions is at least one of: a linear function of only one colorant value of the received contone pixel values of the target pixel wherein the colorant value is the respective colorant value associated with the respective axis and, a linear function of two colorant values of the received contone pixel values wherein one of the two colorant values is the respective colorant value associated with the respective axis.

15. The method of claim 12 wherein defining the marking decision color space comprises:
   defining a marking decision color space that relates sets of color contone pixel values to sets of reduced quantization marking decisions regarding cyan, magenta and yellow colorants, the marking decision space being defined, at least in part, by respective reference points, the respective reference points being those points in the marking decision space that correspond to respective extremes of a range of available contone pixel values and therefore corresponding to marking decisions associated with zero marking decision error for the respective corresponding pixel values and corresponding to white, black cyan, magenta, yellow, blue, green and red colors, the marking decision space definition associating respective subsets of sets of contone pixel values with the marking decision associated with respective ones of the respective reference points based on respective functions of distance in the color space of points identified by the sets of contone pixel values to respective ones of the respective reference points.

16. The method of claim 12 wherein defining the marking decision color space comprises:
   defining a region border around each reference point that is not associated with a marking decision to place a mark for one and only one colorant, the region border encompassing points in the marking decision color space associated with the marking decision of the respective reference point, the region border being defined for the reference set of contone pixel values.

17. The method of claim 16 wherein defining the region boarder around each reference point that is not associated with a marking decision to place a mark for one and only one colorant comprises:
   defining region borders around reference points associated with white, black, red, green and blue colors.

* * * * *